US012394398B2

(12) United States Patent
German

(10) Patent No.: US 12,394,398 B2
(45) Date of Patent: Aug. 19, 2025

(54) ADJUSTABLE NECK JOINT FOR STRINGED INSTRUMENTS

(71) Applicant: Gregory German, Broomfield, CO (US)

(72) Inventor: Gregory German, Broomfield, CO (US)

( * ) Notice: Subject to any disclaimer, the term of this patent is extended or adjusted under 35 U.S.C. 154(b) by 282 days.

(21) Appl. No.: 18/132,803

(22) Filed: Apr. 10, 2023

(65) Prior Publication Data

US 2023/0326434 A1 Oct. 12, 2023

Related U.S. Application Data

(60) Provisional application No. 63/375,184, filed on Sep. 9, 2022, provisional application No. 63/329,191, filed on Apr. 8, 2022.

(51) Int. Cl.
*G10D 3/095* (2020.01)

(52) U.S. Cl.
CPC .................................... *G10D 3/095* (2020.02)

(58) Field of Classification Search
CPC ...................................................... G10D 3/095
See application file for complete search history.

(56) References Cited

U.S. PATENT DOCUMENTS 1,611,648 A * 12/1926 Lange ...................... G10D 1/10 84/293
3,196,730 A * 7/1965 Daniel ..................... G10D 1/08 84/293
3,392,621 A * 7/1968 Pease ....................... G10G 7/02 984/260
6,265,648 B1 * 7/2001 Steinberger .............. G10D 3/06 84/293
7,557,281 B1 * 7/2009 Campling ................ G10D 1/08 84/293
7,816,592 B2 * 10/2010 Babicz ..................... G10D 1/00 84/293
7,875,782 B1 * 1/2011 Nechville ............. G10D 3/095 84/173
8,183,446 B1 * 5/2012 Ward ....................... G10D 1/08 84/267
8,426,709 B2 * 4/2013 Zervas .................. G10D 3/095 84/293
9,368,092 B2 * 6/2016 Hooker .................... G10D 1/08
9,972,288 B2 * 5/2018 Baer ........................ G10D 1/08
10,803,840 B1 * 10/2020 Greene .................... G10D 3/06
2016/0027415 A1 * 1/2016 Hooker .................... G10D 1/08 84/293
2023/0326434 A1 * 10/2023 German ................. G10D 3/095 84/293

* cited by examiner

*Primary Examiner* — Robert W Horn
(74) *Attorney, Agent, or Firm* — Holzer Patel Drennan

(57) ABSTRACT

An adjustable neck joint for a stringed instrument includes a neck with a heel portion formed as a first half of a rotating joint and a body with a neck block formed as a second half of the rotating joint. The first half of the rotating joint and the second half of the rotating joint may each be configured to connect with the other and movably interface with each other such that the neck is rotatable with respect to the body about an axis located immediately adjacent to and above a position along the neck.

18 Claims, 10 Drawing Sheets

ADJUSTABLE NECK JOINT FOR STRINGED INSTRUMENTS

CROSS REFERENCE TO RELATED APPLICATIONS

This application claims the benefit of priority pursuant to 35 U.S.C. § 119(e) of U.S. provisional application No. 63/329,191 filed 8 Apr. 2022 entitled "Adjustable neck joint for stringed instruments" and further claims the benefit of priority pursuant to 35 U.S.C. § 119(e) of U.S. provisional application No. 63/375,184 filed 9 Sep. 2022 entitled "Adjustable neck joint for stringed instruments," each of which is hereby incorporated herein by reference in its entirety.

TECHNICAL FIELD

The technology described herein relates to woodworking joinery for stringed musical instrument design and, more particularly, to a structure for changing the action of the strings above a fingerboard.

In a separate section of the disclosure, the technology described herein relates to a string anchor structure for a hollow body stringed instrument.

BACKGROUND

With respect to a stringed instrument, the "action" is the distance of the strings from the fingerboard, also referred to as a fretboard, on the neck of the instrument. The distance between the strings and the fingerboard surface is often carefully adjusted for player comfort. The strings are typically closest to the fingerboard adjacent to the peghead and are typically furthest from the fingerboard adjacent to the body. Musicians may often select a stringed instrument based upon the type of action they prefer, or modify the action of a stringed instrument to provide a desired string height above the fingerboard.

In the example of an acoustic guitar (and similarly with most other stringed instruments), the strings are anchored at two points: at the headstock or peghead end of the neck, and at the bridge near the middle of the body. Different guitar and other stringed instrument manufacturers may provide different action heights by design of the angle of the neck with respect to the sound body or by selection of the height of the bridge above the soundboard, or through a combination of both. However, even when the action is specifically tuned to the desires of a musician, seasonal changes in humidity may cause the body, e.g., acoustic guitar tops, to swell or shrink which changes the action and affects the playability of the instrument.

The typical method for lowering a "high action" is to change the string height at the bridge. This is accomplished by grinding material off the saddle, the removable part of the bridge that marks one end of the vibrating portion of the string. To adjust and raise a "low action," the saddle is either replaced with a new, taller one or shims are placed beneath it to increase the height of the strings at the bridge. Alternatively, the bridge may be replaced by one with a taller base. These adjustments often require the skill and tools of a luthier. The appropriate action height is arrived at by trial-and-error and requires de-tuning and re-tuning the instrument with each adjustment to the saddle.

The information included in this Background section of the specification, including any references cited herein and any description or discussion thereof, is included for technical reference purposes only and is not to be regarded subject matter by which the scope of the invention as defined in the claims is to be bound.

SUMMARY

In one implementation, a design for attachment of the neck to the body of a stringed musical instrument using an adjustable joint is disclosed. The design of the joint allows the player to change the neck angle for the purpose of making the instrument optimally playable. In another implementation, a distributed bridge structure for a stringed instrument is disclosed with a separate string anchor piece that is positioned underneath the soundboard.

In one implementation, an adjustable neck joint for a stringed instrument includes a neck with a heel portion formed as a first half of a rotating joint and a body with a neck block formed as a second half of the rotating joint. The first half of the rotating joint and the second half of the rotating joint may each be configured to connect with the other and movably interface with each other such that the neck is rotatable with respect to the body about an axis located immediately adjacent to and above a position along the neck.

In another implementation, a stringed instrument includes a neck with a heel portion formed as a first half of a rotating joint and a body with a neck block formed as a second half of the rotating joint. The first half of the rotating joint and the second half of the rotating joint are each configured to connect with each other and movably interface with each other such that the neck is rotatable with respect to the body about an axis perpendicular to a longitudinal axis of the neck. In further implementations, the neck may further include a peghead on an opposite end of the neck from the heel and a fingerboard extending along a top surface of the neck from the peghead to beyond the heel. In further implementations the body may further include a top surface, a bridge mounted on the top surface, and a string termination structure connected to the body.

The stringed instrument may further include a plurality of strings, each connected at a first end to the peghead and at a second end to the string termination structure, extending above and along the fingerboard, and supported above the top surface of the body by the bridge at an intermediate location along a length of each string. The stringed instrument is thereby configured such that upon rotation of the first half of the rotating joint with respect to the second half of the rotating joint, the fingerboard moves toward or away from the strings, thereby adjusting an action of the strings and, upon such adjustment of the action, the strings remain in tune.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

The disclosure will be readily understood by the following detailed description in conjunction with the accompanying drawings, wherein like reference numerals designate like structural elements.

The use of cross-hatching or shading in the accompanying figures is generally provided to clarify the boundaries between adjacent elements, e.g., when shown in cross section, and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

Figure 1A:
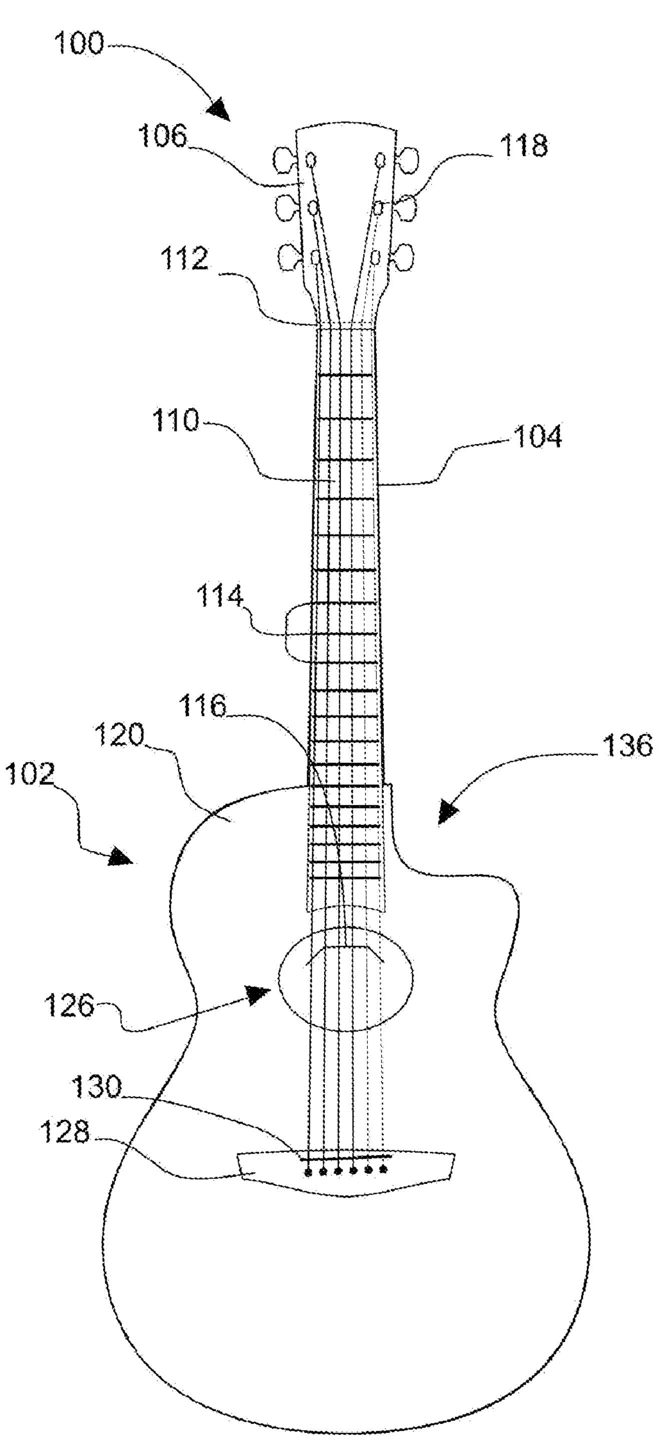

FIG. 1A is a top plan view of an exemplary embodiment of a guitar with an adjustable neck joint as described in the present disclosure.

Figure 1B:
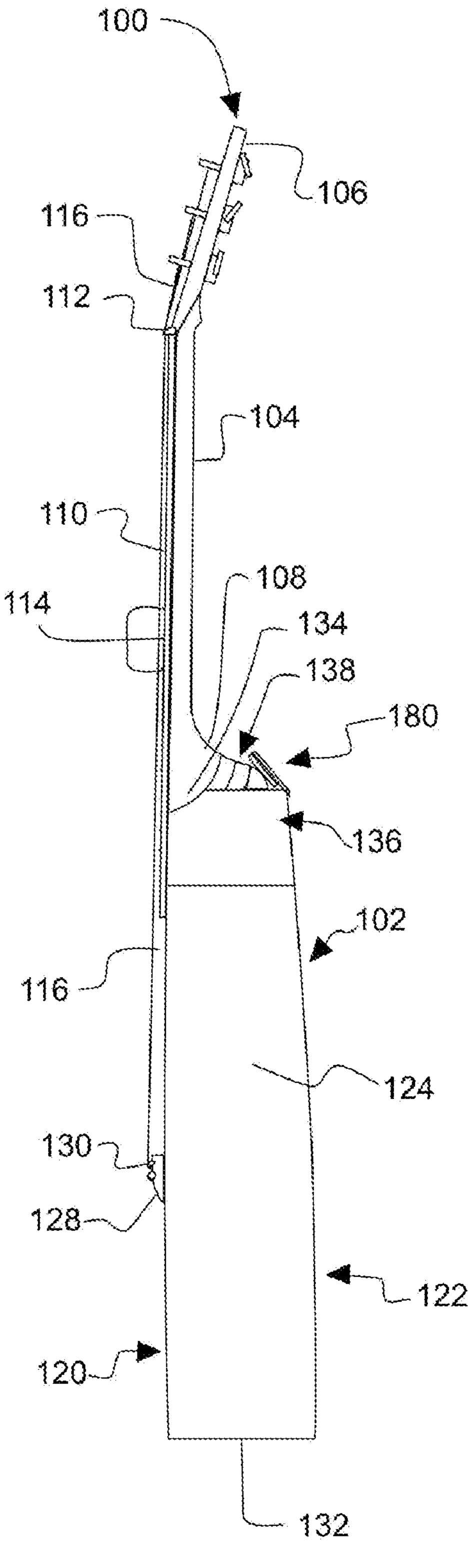

FIG. 1B is a right side elevation view of the guitar of FIG. 1A.

Figure 1C:
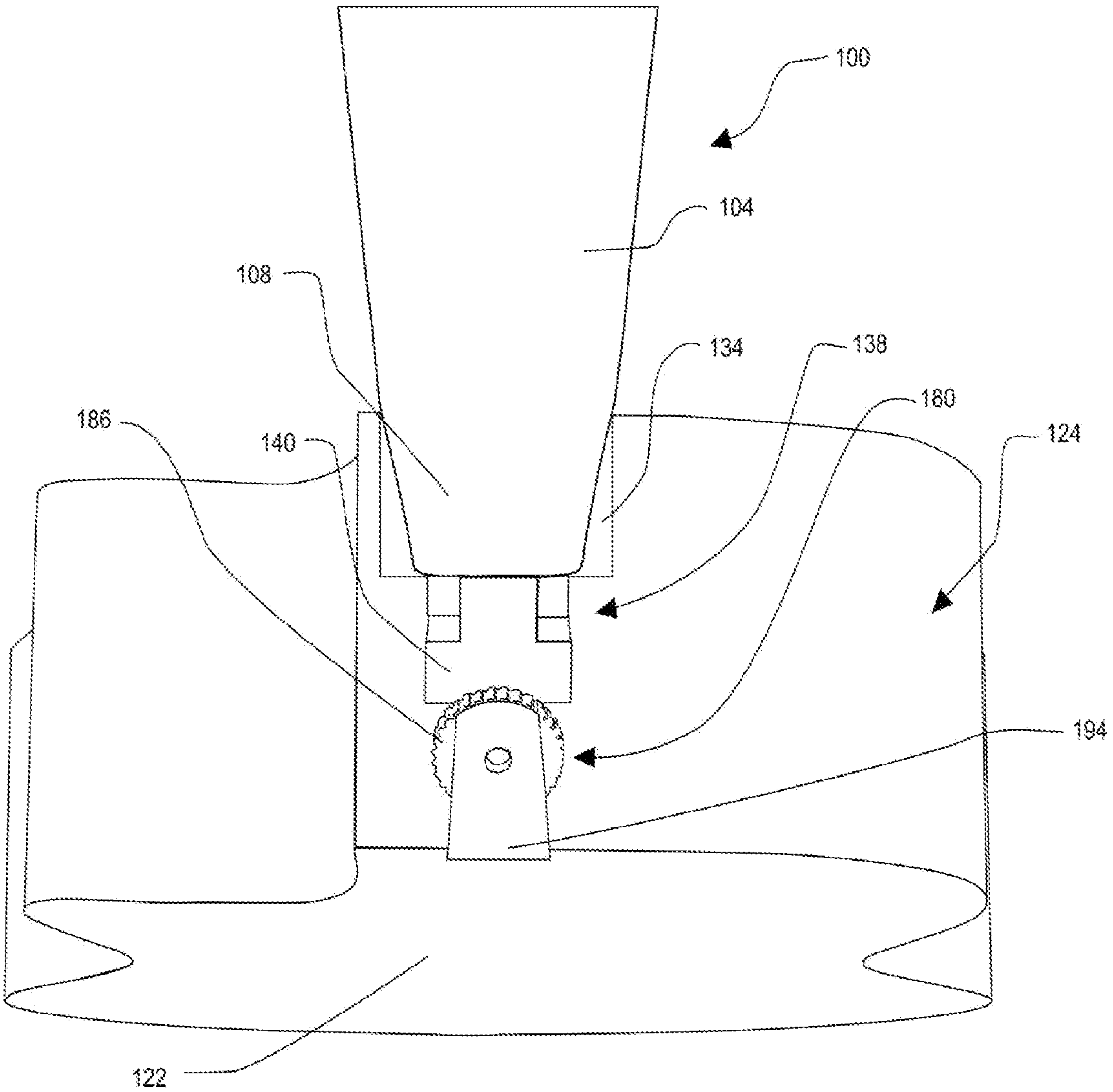

FIG. 1C is a rear perspective view of the guitar of FIG. 1A showing the adjustable neck joint and an exemplary embodiment of a related adjustment mechanism.

Figure 2:
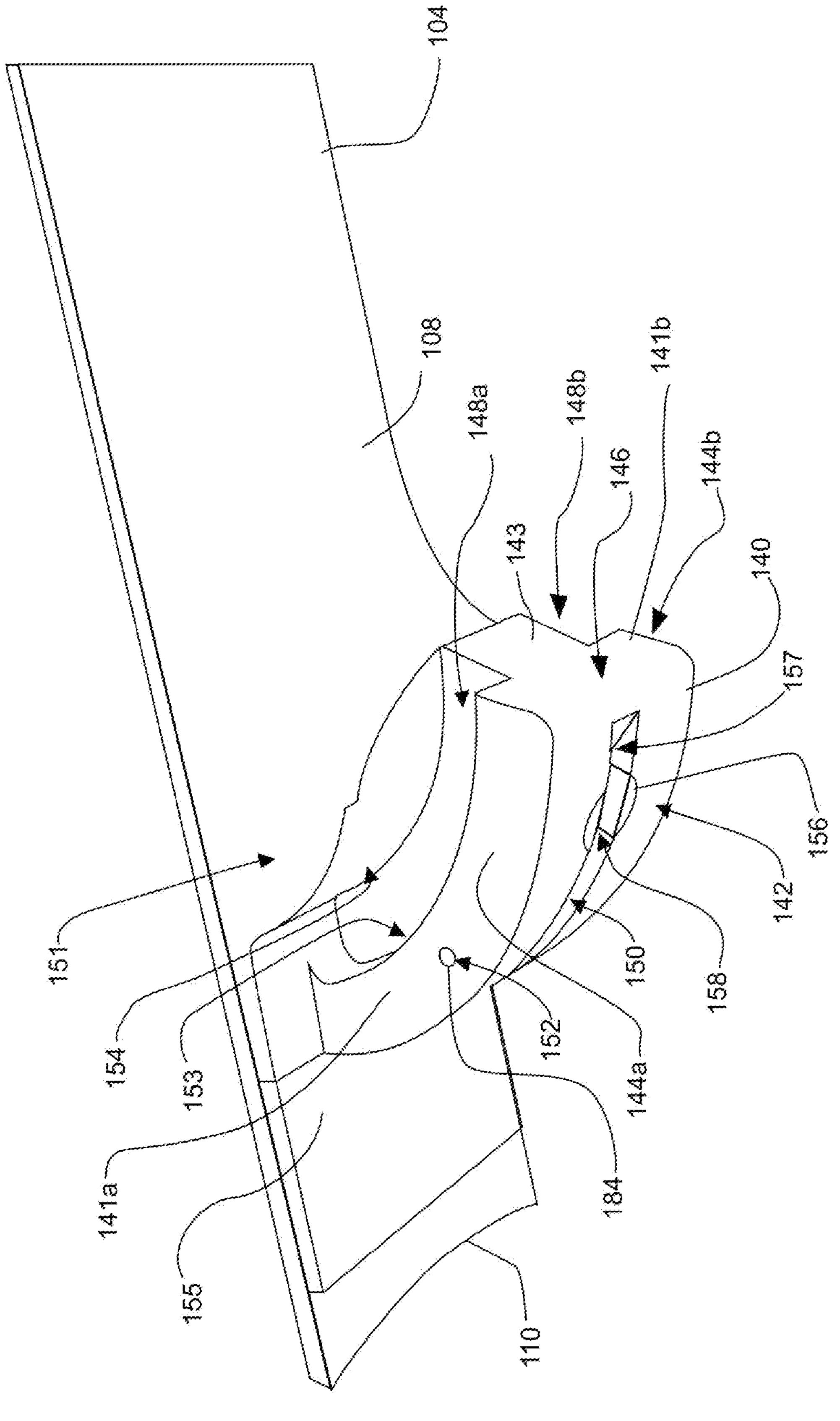

FIG. 2 is a right side, perspective view of the neck of the guitar of FIG. 1A with the tenon portion of the heel partially inserted into the mortise portion of the neck block during assembly of the guitar.

Figure 3B:
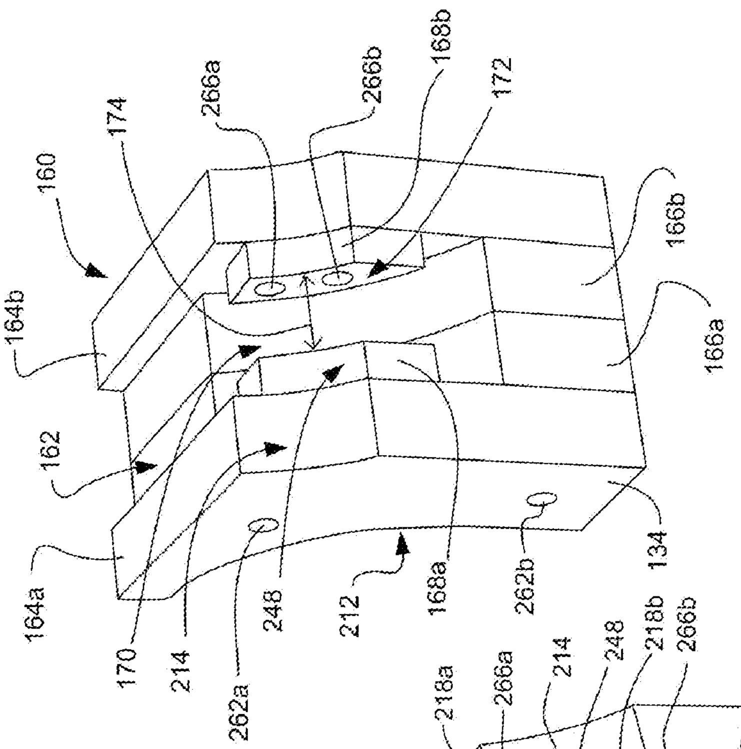
Figure 3A:
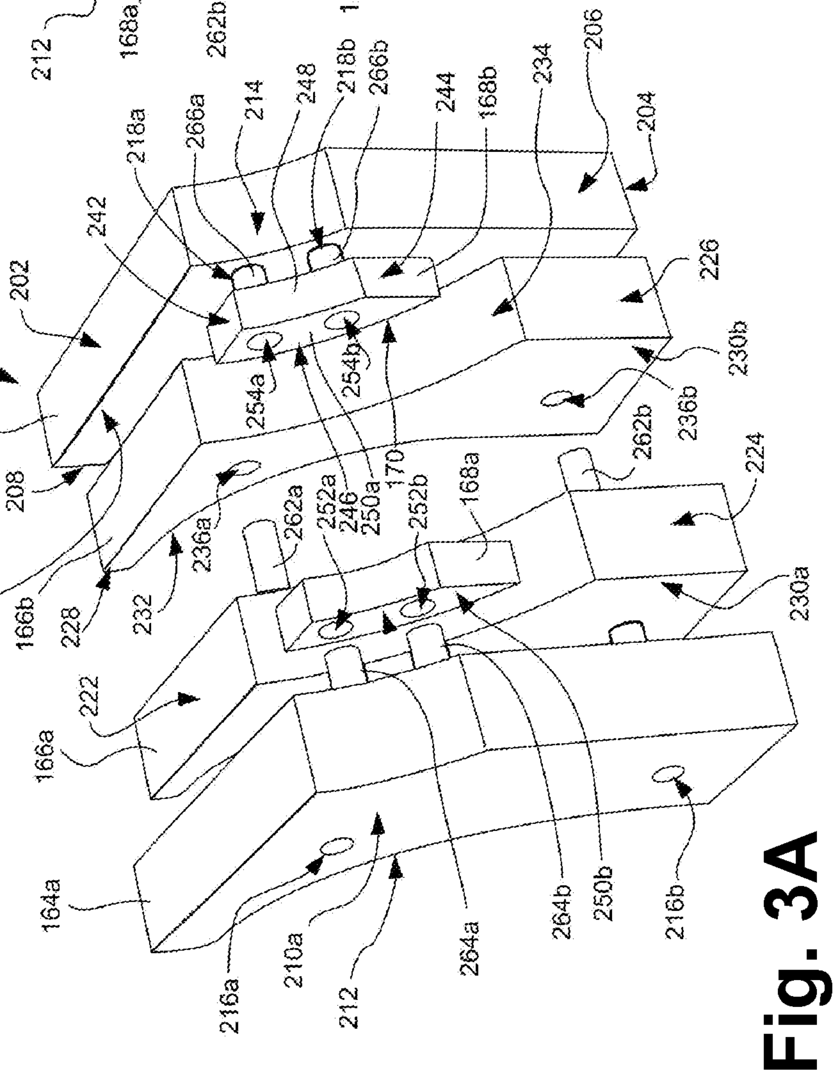

FIG. 3A is an exploded rear perspective view of components of a neck block of the guitar of FIG. 1A that together form a mortise portion of the adjustable neck joint.

FIG. 3B is a rear perspective view of the neck block of FIG. 4A in an assembled configuration.

Figure 4:
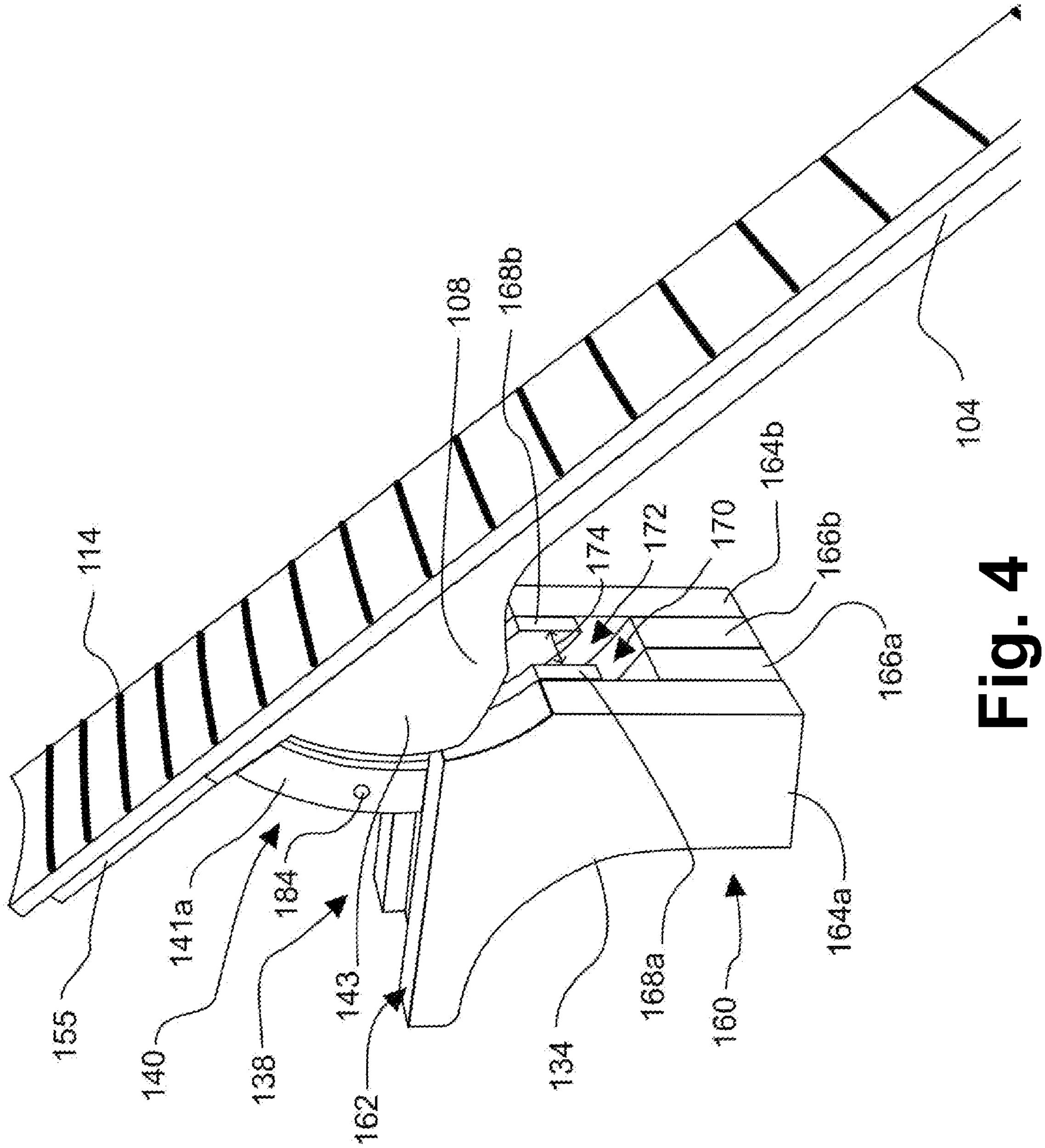

FIG. 4 is a right-side perspective view of the heel of the neck of the guitar of FIG. 1A forming a tenon portion of the adjustable neck joint partially inserted within the mortice portion of FIG. 3B.

Figure 5:
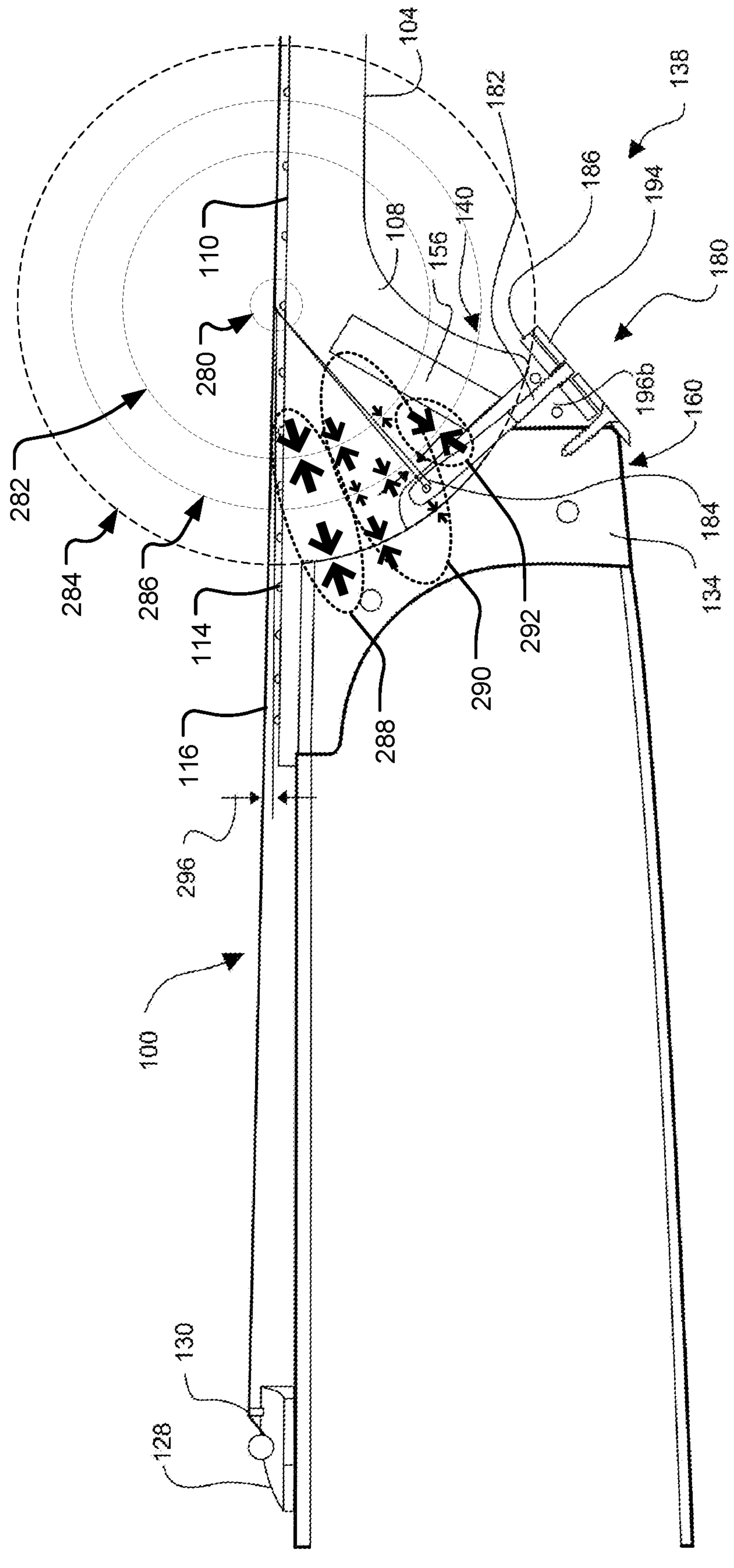

FIG. 5 is a right side, elevation view of the neck of the guitar in cross section joined to the neck block with indications of the range of adjustment of the action provided by the adjustable neck joint and further indications of the relative forces on the tenon portion and the mortise portion across the adjustable neck joint.

Figure 6:
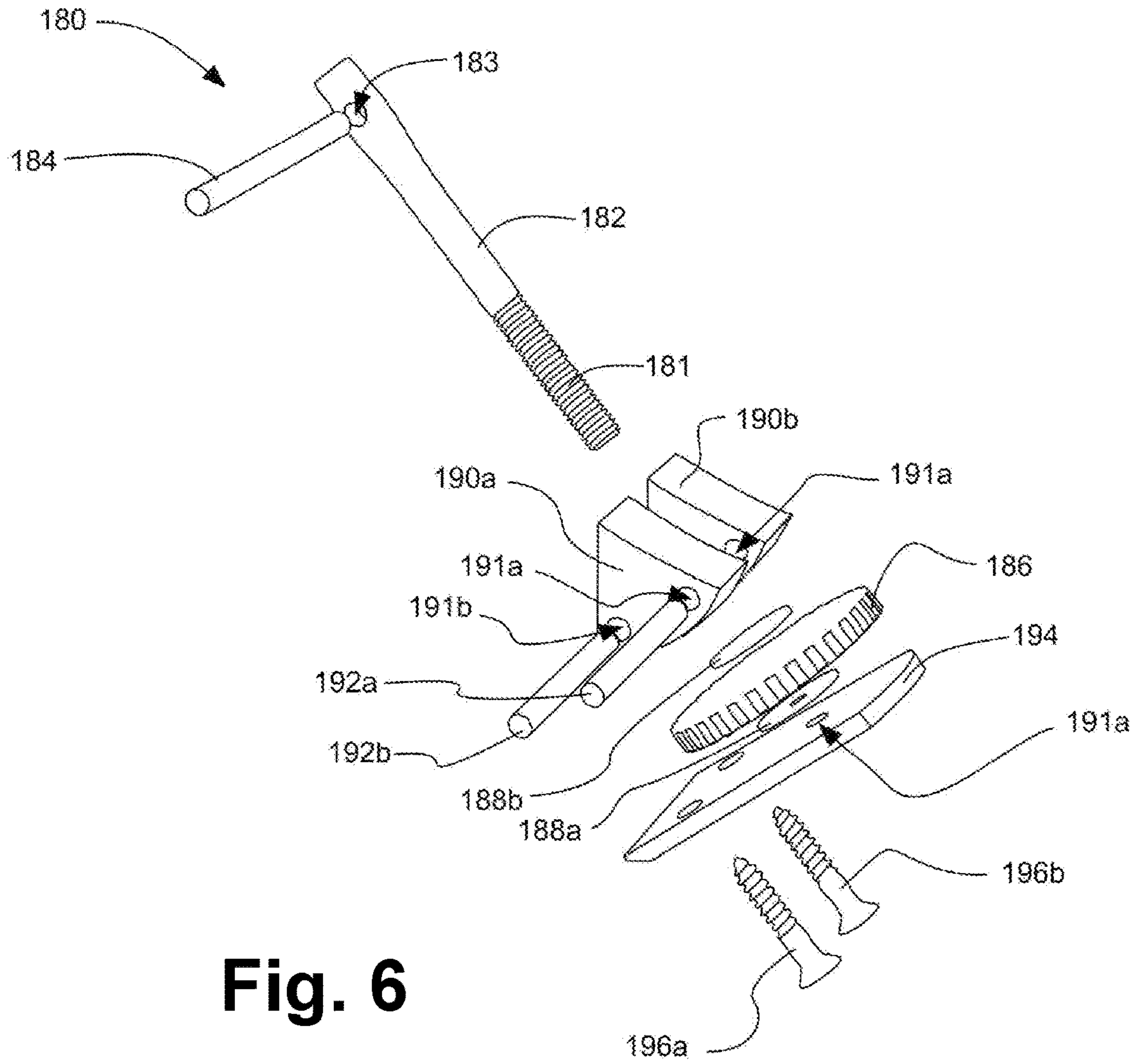

FIG. 6 is an exploded, right side, perspective view of the adjustment mechanism for the adjustable neck joint of the guitar of FIG. 1A.

Figure 7:
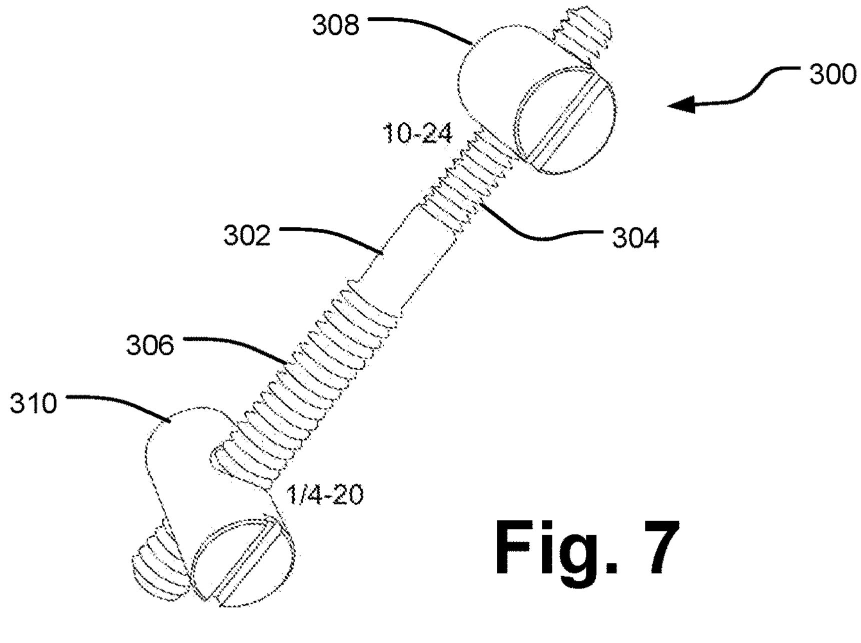

FIG. 7 is a perspective view of an alternate embodiment of a tie rod of an adjustment mechanism for use with the adjustable neck joint of the guitar.

Figure 8:
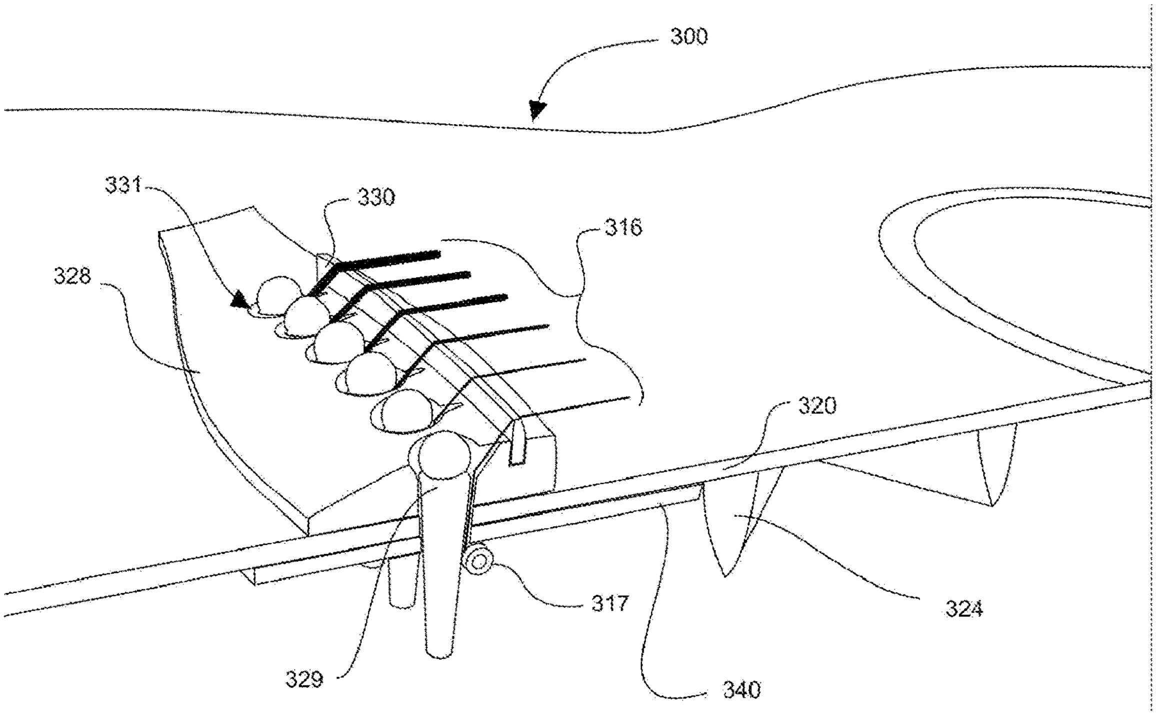
Fig. 8 (Prior Art)

FIG. 8 is a cross section view of a prior art guitar bridge showing the ball ends of the guitar strings secured with bridge pins beneath the soundboard and bridge plate.

Figure 9:
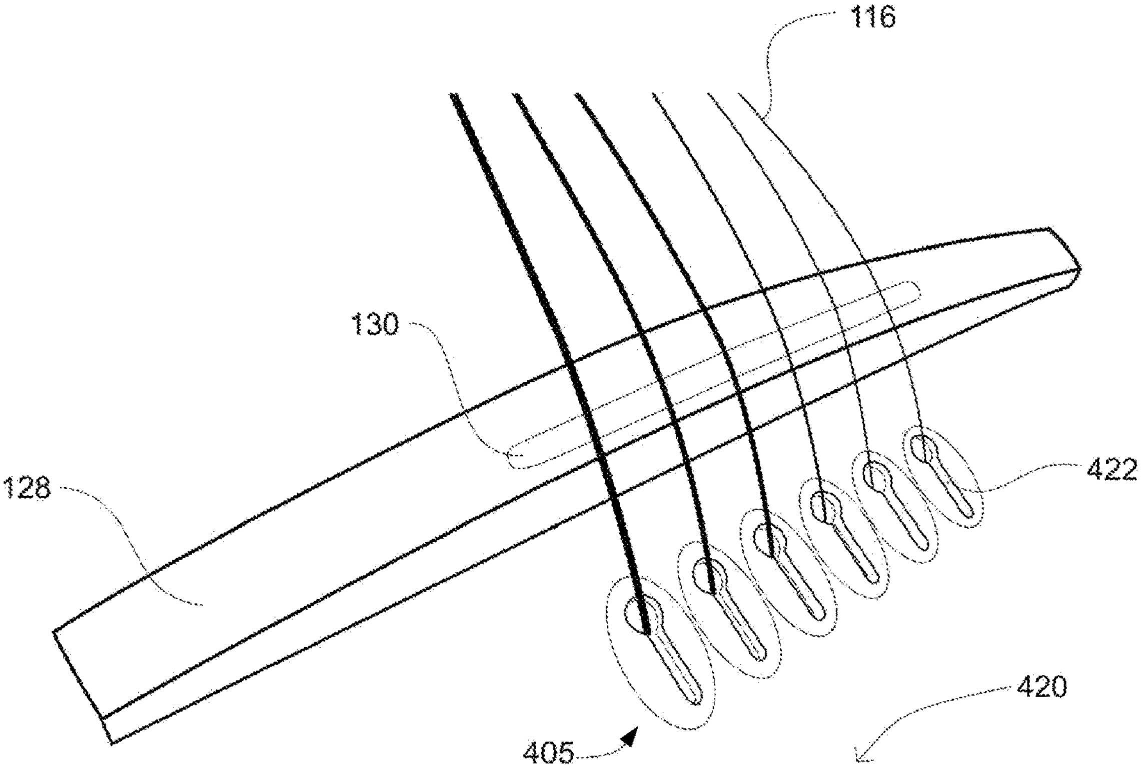

FIG. 9 is a perspective view of an example implementation of a floating bridge and eyelets through the top soundboard through which the ends of the guitar strings pass.

Figure 10:
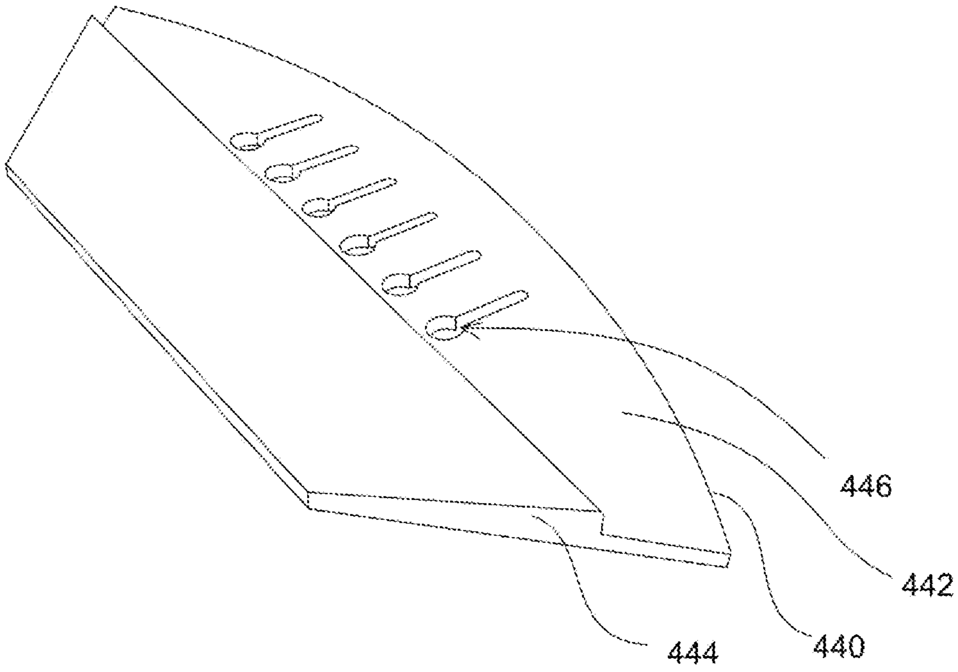

FIG. 10 is a bottom perspective view of an example implementation of a bridge plate.

Figure 11:
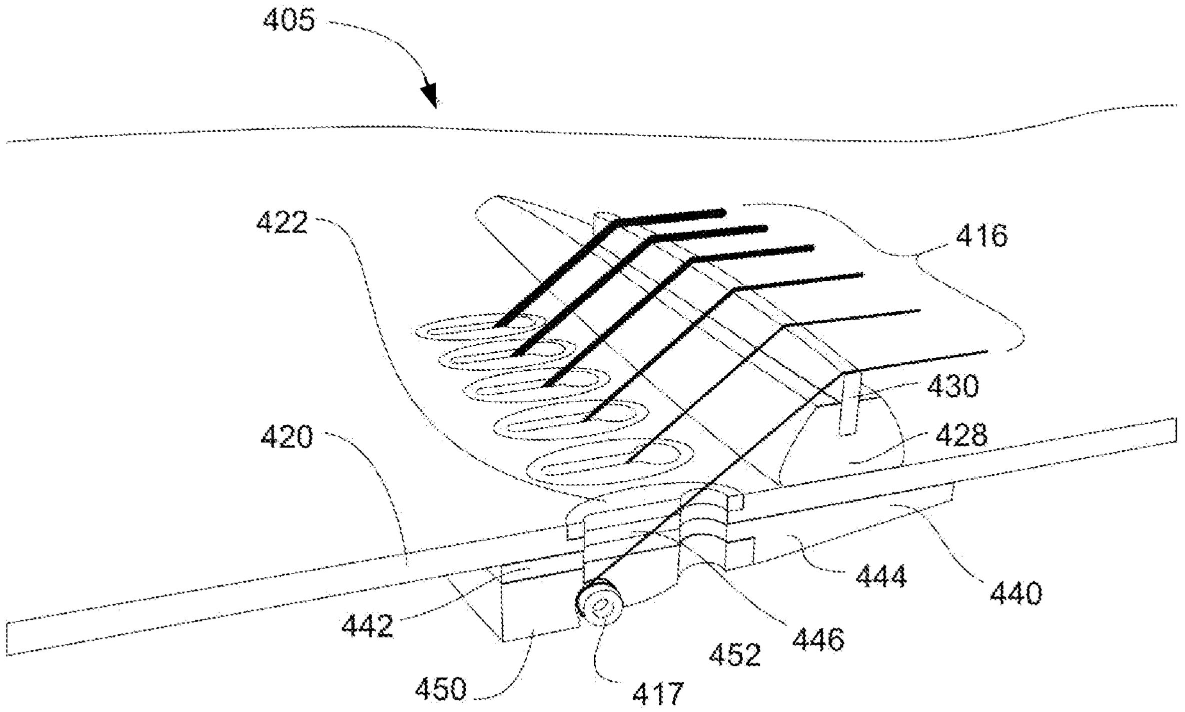

FIG. 11 is a bottom perspective view of a removable string anchor.

Figure 12:
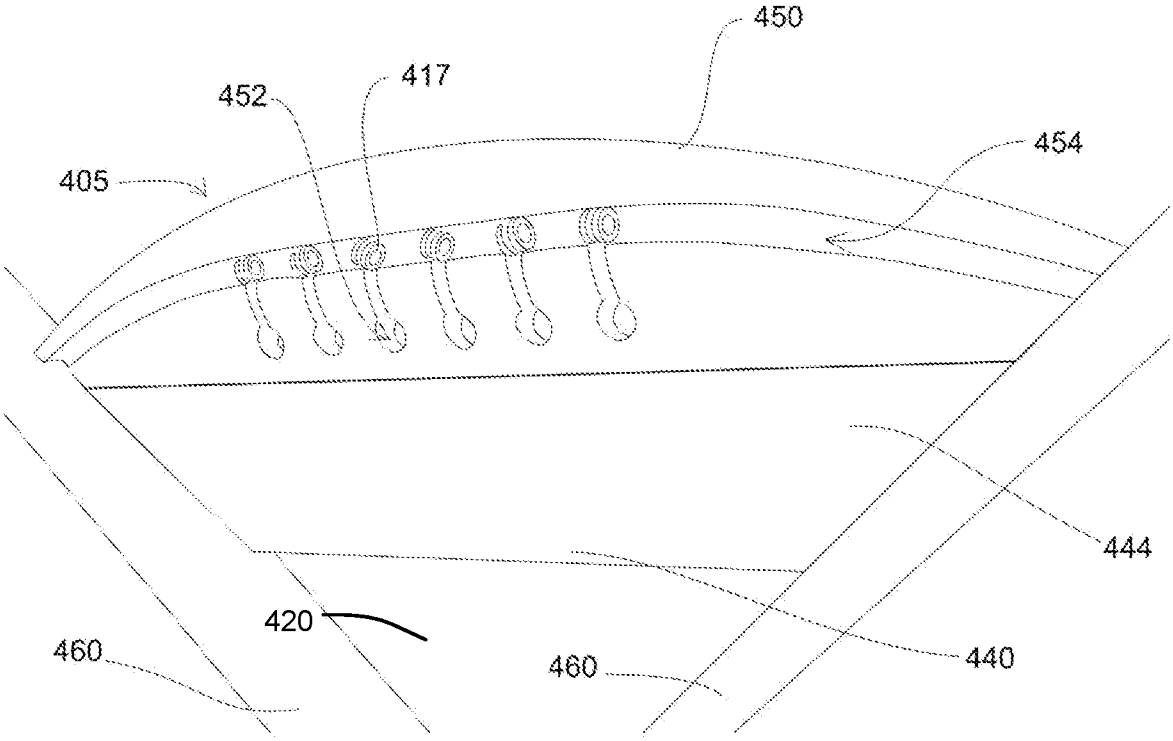

FIG. 12 is a cross section view of the soundboard and bridge of FIG. 9 depicting a removable string anchor of FIG. 11 retained against the bridge plate of FIG. 10 and securing the ball ends of the guitar strings.

Figure 13:
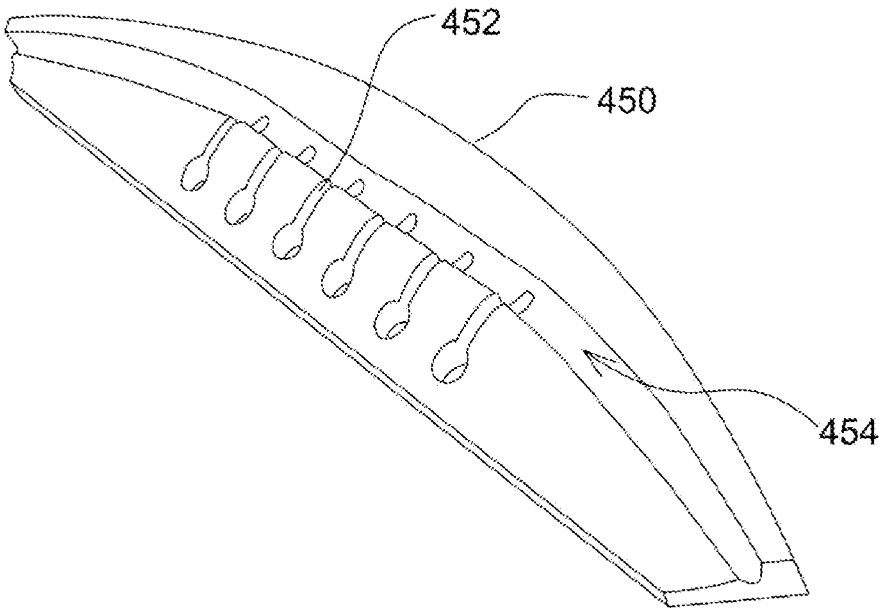

FIG. 13 is bottom, perspective view of the removable string anchor of FIG. 11 retained against the bridge plate of FIG. 10, mounted against bracing strips on an inner surface of the soundboard, and securing the ball ends of the guitar strings.

DETAILED DESCRIPTION

In a first implementation, a stringed instrument with an adjustable neck joint is disclosed. In this document, a guitar has been chosen as the exemplary string instrument to demonstrate the neck joint. However, the adjustable neck joint as disclosed herein is equally adaptable for use an implementation with any stringed instrument, acoustic or electric, having a fingerboard or fretboard connected to a body, for example, violins, violas, cellos, basses, banjos, mandolins, lutes, sitars, and others. The adjustable neck joint disclosed herein allows a player to make precise adjustments to the action height without modifying the saddle or detuning the strings. An adjustment mechanism may be incorporated to push or pulls on the base of the neck within the joint, which causes the neck to rotate along an arc about an axis transverse a longitudinal axis of the neck. In an example implementation, the axis of rotation is transverse to the length of the strings and positioned on the strings at a chosen location along the neck.

In order to better understand the present disclosure, an acoustic guitar 100 with an embodiment of an adjustable neck joint 138 is depicted in FIGS. 1A-1C. As with most acoustic guitars, the guitar 100 has a body 102 connected to a neck 104, which extends from the rear of the body 102. The neck 102 is typically made from a solid piece of wood and may be formed with a hollow shaft to receive a reinforcing truss rod. However, such is not required. The neck 104 is generally smooth and curved on the back side and flat on the front side. A headstock 106 or peghead is formed at the distal end of the neck 104 and is unitary, i.e., is formed within the same piece of wood as the neck 104 for strength. A heel portion 108 of the neck 104 is formed on the opposite end of the neck 104 from the headstock 106 and is configured for attachment of the neck 104 to the body 102.

A fingerboard 110 lays on top of the flat side of the neck 104. A nut 112, which is actually a block arranged transverse to the longitude of the neck 104, caps the distal end of the fingerboard 110 at the transition from the neck 104 to the headstock 106. The nut 112 may have six grooves that are spaced laterally apart from each other such that the centers of each groove are equidistant from adjacent grooves. Some of the grooves may be wider than other grooves in a descending order to accommodate the heavier (thicker) strings that provide lower pitches. The grooves in the nut 112 keep the strings separated from each other across the length of the guitar 100. The fingerboard 110 on the guitar 100 is inlaid with frets 114, which are typically metal bars that are arranged transverse to the length of the neck and demark positions at which the effective length of the string can be shortened to change the note played. However, many stringed instruments, for example, violins, violas, cellos, and basses, do not use frets and the musician merely presses a string against the fingerboard to change the note. The guitar 100 is typical with six strings 116 of varying diameter to provide a wide range of notes of various pitch. At a first end, the strings 116 are connected to the headstock 106 with tuning pegs 118.

At a second end, the strings 116 are connected to the body 102 of the guitar 100. The body 102 is composed of a top soundboard 120 and a bottom backboard 122, which are connected by a sidewall 124 to form a hollow enclosure. The soundboard 120 defines a sound hole 126, typically within the center of the body 102 and directly beneath the strings 116 as they stretch across the body 102. A bridge 128 sits on top of the soundboard 120 beyond the sound hole 126 and provides the termination location (e.g., a pin hole section) for the second end of the strings 116. A saddle 130 seats within the bridge 128 and the strings 116 held against the saddle 130. The saddle 130 is similar to the nut 112 in that it is a hard block that is oriented transverse to the length of the strings 116. The saddle 130 may or may not have grooves like the nut 112 for separation of the strings 116. If the bridge 128 provides fixed termination locations for the strings 116 that are spaced laterally apart and equidistant from each other (e.g., as with a pin hole section in the bridge), the saddle 130 may not be provided with grooves as the pins in the bridge 128 will keep the strings 116 separated from each other across the length of the guitar 100.

The strings 116 are placed under tension between the nut 112 at the first end and the saddle 130 at the second end by winding the first ends around the tuning pegs 118. The length of the strings 116 between the nut 112 and the saddle 130 is predetermined to result in appropriate standard harmonics for each string when played openly as well as when pressed against a fret 114. The frets 114 are appropriately spaced apart to change the length of each string 116 at locations that result in different harmonic notes. The tuning pegs 118 rotate to tighten or loosen the strings to manipulate the pitch of each of the strings 116 and ultimately create appropriate tension such that each string 116 is "in tune."

The sidewalls 124 of the body 102 are typically affixed to a tail block 132 within the hollow of the body at the tail end to hold them together at a first end, and are affixed to a neck block 134 at an opposite end of the body 102 where the neck 104 attaches. In typical guitars, the neck is rigidly and fixedly attached to the neck block to prevent collapse of the joint between the neck and body when the strings are placed under tension. Tensions across the strings placed on an acoustic guitar can range from a low as 60 lbs (267 N) (e.g., for a guitar with nylon strings or with light gauge strings attached to a tailpiece) to up to 170 lbs (756 N) or more for a guitar with steel wire strings and a pin hole attachment within a pin bridge. However, in embodiments of the guitar 100 as disclosed herein, the neck 104 is movably attached to the neck block 134 using an adjustable neck joint structure 138 as further described herein. Additionally, and adjustment mechanism 180 may be provided in conjunction with the adjustable neck joint 138 to both resist movement of the neck joint 138 once a desired position is selected and to further make fine adjustments to the "action" of the strings 116.

With most acoustic guitars (as well as other stringed instruments), the primary method for changing the action, i.e., the height of the strings above the fingerboard (particularly near the base of the neck adjacent to the body), is to change the height of the saddle. While the ridge could also be removed and replaced with a different saddle seat, this is much more difficult in the case of a pin bridge (i.e., a bridge that provides a termination structure for the strings), which is typically glued to the soundboard and requires the skills of a luthier. The height of the saddle above the wood of the bridge typically has a finite range of adjustment (from 0 mm to ~6-8 mm), either lowering by trimming the saddle or raising by shimming under the saddle in the channel in the bridge where the saddle is seated.

The force vector exerted by the string tension mostly compresses the saddle into its slot in the bridge when the saddle is short, but as the height of a saddle increases, the force vector points more towards the bridge pins. When the strings are under tension, a tall saddle acts as a lever arm, which twists the bridge and the top of the soundboard to which the bridge is adhered along that force vector. A maximum height for a saddle above the soundboard is limited by the strength of the materials of the guitar since either the bridge or saddle will crack under the torque if the saddle is adjusted too high. The wood of the bridge is the obvious lower boundary for reducing the string height. Over time, the strings under tension may cut into the saddle and undesirably lower the action. This may be addressed relatively easily by shimming or replacing the saddle. Addressing an undesirably high action is more difficult.

Most guitars are constructed with a neck that is either glued or bolted to the body at a fixed angle which in turn determines how tall the bridge and saddle must be for a comfortable action. Over several decades under tension, the guitar body and neck commonly flex and warp to the extent that the lowest adjustment of the saddle still leaves too high an action above the fingerboard to reasonably play the guitar. Resetting the neck angle solves the issue, but that is accomplished by removing the neck from the body and carefully chiseling and sanding wood off the mating surface at the heel of the neck where it mates with the neck block. This is an expensive and technical job requiring the skills of a luthier.

The violin family of instruments usually have a neck connected to the body by way of a V-shaped sliding dovetail joint. The mating surface between the side (ribs) of the instrument body and the heel of the neck determines the neck angle, and the dovetail is carved for a snug fit which presses the mating surfaces together. The mating surfaces are further fixed together with glue. This type of neck joint is not adjustable per se and more difficult to remove than a bolted-on neck, but it can be dismantled and re-set by a skilled woodworker by adding veneers and chiseling and sanding the mating surfaces in order to change the angle where the neck meets the body and maintaining a tight joint.

In contrast to these methods for joining a neck to a body of a stringed instrument, the present disclosure details an adjustable neck joint 138 formed as a curved, mortise and tenon sliding dovetail as shown in greater detail in FIG. 2. The tenon portion 140 of the adjustable neck joint 138 is formed on the heel 108 of the neck 104 as depicted in FIG. 3, shown in isolation, separated from the body 102. The mortise portion 160 is formed within the tail block 132 of the body 102 as depicted in FIGS. 4A and 4B. As noted, the tenon portion 140 is formed as a curved, T-shaped rail within the heel 108 unitary with the neck 104 (i.e., the tenon portion 140 is formed within the same piece of wood stock as the neck 104. The tenon portion 104 is defined by an arcuate bottom surface 142 bounded by two arcuate, lateral sidewalls 144*a*, 144*b* that are perpendicular to the arcuate bottom surface 142. A butt surface 146 forms the free end of the tenon portion 140 and may be formed as a curved surface following the curve of the outer surface of the heel 108 to provide a smooth transition from the heel 108 to the tenon portion 140. Lateral arcuate channels 148*a*, 148*b* are formed within each of the arcuate sidewalls 144*a*, 144*b* and each is bounded by a lower arcuate wall 153 and an upper arcuate wall 154. Lateral arcuate rails 141*a*, 141*b* and a center arcuate post 143 are thus formed by the arcuate channels 148*a*, 148*b*. The lower arcuate wall 153 is narrower than the upper arcuate wall 154, which extends transversely outward to meet the widest portion of the heel 108 of the neck 104 at a block surface 151. The depth of the arcuate channels 148*a*, 148*b* terminates at a bed plate 155, which extends beyond the heel 108 and beyond the arcuate bottom surface 142 of the tenon portion 140 to support the portion of the fingerboard 110 that extends over the soundboard 120 on the body 102.

In order to strengthen the tenon portion 140, a reinforcement dowel 156 may be fixed (e.g., glued) within a receiving shaft 157 bored through the arcuate bottom surface 142 and extending as a blind hole into the heel 108. The angle of the axis of the receiving shaft 157 is normal to the arcuate bottom surface 142 and is positioned in the longitudinal center of the arcuate bottom surface 142 between the tenon sidewalls 144*a*, 144*b*. The receiving shaft 147 is offset from the butt wall 146 sufficiently that the reinforcement dowel 156 extends into the center mass of the heel 108. As described later herein, the forces on the adjustable neck joint 138 may cause significant stress forces across the tenon portion 140. In this location, the forces may be across the grain of the wood in this region of the tenon portion 140 as compared with the rest of the neck 104, wherein the forces are primarily in compression along the grain of the wood. The reinforcement dowel 156 may thus provide additional strength to the tenon portion 140.

A channel 150 for receiving a tie rod component of the adjustment mechanism 180 may be formed within the bottom arcuate surface 142. As the reinforcement dowel 156 also extends to the bottom arcuate surface 142, the channel 150 may also be formed within the base portion of the reinforcement dowel 156 as a notch 157. A hinge pin hole 152 is also bored laterally trough the tenon portion 140 between the tenon sidewalls 144*a*, 144*b*. A hinge pin 184 for pivotably connecting the tie rod component to the tenon portion 140 resides in the hinge pin hole 152. (The components of the adjustment mechanism 180 are described in greater detail herein in FIG. 6.)

The mortise portion 160 of the adjustable neck joint 138 is depicted in FIGS. 4A and 4B. The components of the mortise portion 160 are shown in an exploded view in FIG. 4A and the assembled mortise portion 160 is depicted in FIG. 4B. The assembled mortise portion 160 also functions as the neck block 134 for joining the sidewalls 126 of the body 102 adjacent to the neck. The mortise portion 160 is formed primarily of a pair of outer mortise blocks 164*a*, 164*b*, a pair of inner mortise blocks 166*a*, 166*b*, and a pair of mortise retainer blocks 168*a*, 168*b* held together by a number of dowels as described below.

Each outer mortise block 164*a*, 164*b* is slightly taller than the corresponding inner mortise blocks 166*a*, 164*b*, and is bounded by a rectangular box form defined by a flat top surface 202, a flat bottom surface 204, a flat front surface 206, a flat rear surface 208, and flat, lateral outer and inner surfaces 210*a*, 210*b*. A rear wall of each outer mortise block 164*a*, 164*b* is formed as a large diameter arcuate brace 212 curving concavely between the rear surface 208 at an upper edge and the bottom surface 204 at a lower edge. A top portion of the front face of the outer mortise blocks 164*a*, 164*b* forms an arcuate bevel 214 curving concavely between the front edge of the top surface 202 and the front edge of the bottom surface 204, but has a much shorter arc length than the arcuate brace 212. Each of the outer mortise blocks 164*a*, 164*b* also defines a first set of upper and lower blind holes 216*a*, 216*b* for ultimate receipt of corresponding dowels for connection to the inner mortise blocks 166*a*, 166*b*. The openings to the first set of blind holes 216*a*, 216*b* are formed within the inner surfaces 210*b* of each of the outer mortise blocks 164*a*, 164*b*. Each of the outer mortise blocks 164*a*, 164*b* further defines a second set of upper and lower blind holes 218*a*, 218*b* for ultimate receipt of corresponding dowels for connection to the mortise retainer locks 168*a*, 168*b*. The openings to the second set of blind holes 218*a*, 218*b* are formed within the inner surfaces 210*b* of each of the outer mortise blocks 164*a*, 164*b*.

The inner mortise blocks 166*a*, 166*b* are slightly shorter than the corresponding outer mortise blocks 164*a*, 164*b*, and each is bounded by a rectangular box form defined by a flat top surface 222, a flat bottom surface 224, a flat front surface 226, a flat rear surface 228, and flat, lateral outer and inner surfaces 230*a*, 230*b*. A rear wall of each inner mortise block 166*a*, 166*b* is formed as a large diameter arcuate brace 232 curving concavely between the rear surface 228 at an upper edge and the bottom surface 224 at a lower edge. The arcuate brace 232 of each inner mortise block 166*a*, 166*b* is congruent in radius and arc length with the large diameter arcuate brace 212 of the outer mortise blocks 164*a*, 164*b*. A top portion of the front face of the inner mortise blocks 166*a*, 166*b* forms a channel surface 234 curving concavely between the front edge of the top surface 222 and the front edge of the bottom surface 224, but has a shorter arc length than the arcuate brace 232 and a longer arc length than the arcuate bevels 214 of the outer mortise blocks 164*a*, 164*b*. Each of the inner mortise blocks 166*a*, 166*b* also defines a pair of upper and lower through holes 236*a*, 236*b* for ultimate receipt of corresponding dowels. The openings to the through holes 236*a*, 236*b* extend between the outer surfaces 230*a* and the inner surfaces 230*b* of each of the inner mortise blocks 166*a*, 166*b*. In some implementations, the pieces of wood used for the outer mortise blocks 164*a*, 164*b* and the inner mortise blocks 166*a*, 166*b* may be selected and oriented such that the grain in each of the block is oriented diagonally upwards, but at slightly different angles to increase the strength of the mortise portion 160 and avoid introducing complementary weaknesses.

Each of the mortise retainer blocks 168*a*, 168*b* is formed as an arcuate solid segment (like a comma or quotation mark in form) bounded by a flat top surface 242, a flat front surface 244, an arcuate rear retainer surface 246, a flat rear surface 228, and flat, lateral outer and inner surfaces 230*a*, 230*b*. The arcuate rear surface 246 curves convexly between the top surface 242 at an upper edge and the front surface 244 at a lower edge. The arcuate bevel surface 248 curves concavely between the top surface 242 at an upper edge and the front surface 244 at a lower edge. A first of the mortise retainer blocks 168*a* also defines a pair of upper and lower through holes 252*a*, 252*b* extending between the outer surface 250*a* and the inner surface 250*b* for ultimate receipt of corresponding dowels. A second of the mortise retainer blocks 168*b* further defines a pair of upper and lower through holes 254*a*, 254*b* extending between the outer surface 250*a* and the inner surface 250*b* for ultimate receipt of corresponding dowels.

A first pair of upper and lower dowel rods 262*a*, 262*b* are provided to connect all of the outer mortise blocks 164*a*, 164*b* and the inner mortise blocks 166*a*, 166*b* together. The inner surfaces 210*b* of each of the outer mortise blocks 164*a*, 164*b* are positioned adjacent to the outer surfaces 230*b* of each of the inner mortise blocks 166*a*, 166*b*. The inner surfaces 230*a* of each of the inner mortise blocks 166*a*, 166*b* are also positioned adjacent to and directly opposite each other. The upper dowel 262*a* extends through the upper through holes 236*a* of each of the inner mortise blocks 166*a*, 166*b* and is long enough to further extend into the upper blind holes 216*a* of each of the outer mortise blocks 164*a*, 164*b*. The lower dowel 262*a* extends through the lower through holes 236*b* of each of the inner mortise blocks 166*a*, 166*b* and is long enough to further extend into the lower blind holes 216*b* of each of the outer mortise blocks 164*a*, 164*b*.

When assembled, the outer mortise blocks 164*a*, 164*b* and the inner mortise blocks 166*a*, 166*b* are sandwiched firmly together in the order described and are held together by the upper and lower dowel rods 262*a*, 262*b*, which are glued within the respective holes. As shown in FIG. 4B, once assembled, a recessed fretboard bed 162 is formed by the top surfaces 222 of the inner mortise blocks 166*a*, 166*b* between the taller outer mortise blocks 164*a*, 164*b*. A recessed arcuate mortise channel 170 is also formed by the channel surfaces 234 of the inner mortise blocks 166*a*, 166*b* between the outer mortise blocks 164*a*, 164*b* due to the larger arc length of the channel surfaces 234 as compared to the shorter arc length of the arcuate bevels 214 of the outer mortise blocks 164*a*, 164*b*.

The mortise retainer blocks 168*a*, 168*b* are also connected to the outer mortise blocks 164*a*, 164*b* in the final assembly of the mortise portion 140. The mortise retainer blocks 168*a*, 168*b* is respectively attached to the inner surfaces 201*b* of corresponding outer mortise retainer blocks 164*a*, 164*b* by separate sets of dowel rods, i.e., left upper and lower dowels 262*a*, 262*b* and right upper and lower dowels 264*a*, 264*b* which extend through respective upper and lower through holes 252*a*, 252*b* of the mortise retainer blocks 168*a*, 168*b* and continue into the upper and lower blind holes 218*a*, 218*b* within the inner surfaces 210*b* adjacent to the arcuate bevel 214 on each of the outer mortise blocks 164*a*, 164*b*. The inner surface 250*b* of each of the mortise retainer blocks 168*a*, 168*b* is secured against the respective inner surfaces 210*b* of each of the outer mortise blocks 164*a*, 164*b*.

The mortise retainer blocks 168*a*, 168*b* are formed such that, when attached to the outer mortise blocks 164*a*, 164*b*, the arcuate bevels 248 of the mortise retainer blocks 168*a*, 168*b* have the same radius of curvatures as the arcuate bevels 214 of the outer mortise blocks 164*a*, 164*b* and together create a smooth, arcuate surface on the mortise portion 140. Similarly, the flat front surfaces 244 of the mortise retainer blocks 168*a*, 168*b* are in alignment with the flat front surfaces 206 of the outer mortise blocks 164*a*, 164*b* and together create a smooth, flat surface. The flat top surfaces 242 of the mortise retainer blocks 168*a*, 168*b* are recessed from the top surfaces 202 of the outer mortise blocks 164*a*, 164*b* but are in planar alignment with the top surfaces 222 of the of the inner mortise blocks 166*a*, 166*b* and are thus in the same plane as the fretboard bed 162. The radius of curvature of the arcuate rear retainer surface 246 of each of the mortise retainer blocks 168*a*, 168*b* is smaller than a radius of curvature of the channel surfaces 234 of each of the inner mortise blocks 166*a*, 166*b*, thus creating a separation distance or gap between the inner mortise blocks 166*a*, 166*b* and the mortise retainer blocks 168*a*, 168*b* to form the rail retention slots 172. The widths of the mortise retainer blocks 168*a*, 168*b* are also narrower than the widths of the inner mortise blocks 166*a*, 166*b* such that there is a separation distance 174 between the inner surfaces 250 of each of the mortise retainer blocks 168*a*, 168*b* when the mortise portion 140 is assembled.

Returning to FIG. 2, an initial step in assembly of the adjustable neck joint 138 is depicted. The tenon portion 140 of the heel 108 of the neck 104 is inserted into the mortise channel 170 of the mortise portion 160 such that the arcuate rails 141*a*, 141*b* slide along the mortise channel 170 within the rail retention slots 172. The arcuate tenon post 143 fits snugly between the mortise retainers 168*a*, 168*b* within the separation distance 174, which is chosen to be substantially congruent with the width of the tenon post 143. The neck 104 may then be rotated to slide the tenon portion 140 within the mortise portion 160 until the bed plate 155 seats in the fretboard bed 162. At this point, the neck 104 is fully attached to the neck block 134 in the body 102 and the fingerboard 110 is at its lowest position, meaning that when the strings 116, they will be at their highest action.

FIG. 5 depicts the forces acting on the adjustable neck joint 138 when the strings 116 are tuned and under typical tension. With the arcuate mortise and tenon construction of the adjustable neck joint 138, there are three surfaces that interface with each other in the adjustable neck joint 138: a heel-mortise interface 282 (between the upper arcuate wall 154 on the heel 108 and the arcuate bevels 214 on the outer mortise blocks 164*a*, 164*b* and the arcuate bevels 248 on the mortise retainer blocks 168*a*, 168*b*); a tenon-retainer interface 286 (between the lower arcuate walls 153 of the tenon rails 141*a*, 141*b* and the rear retainer surfaces 246 of the mortise retainer blocks 168*a*, 168*b*); and a tenon-mortise interface 286 (between the arcuate bottom surface 142 of the tenon rails 141*a*, 141*b* and the surface of the mortise channel 170). As shown in FIG. 5, when the joint is under compression, there are generally three regions of differing forces: an upper joint stress region 288 with generally higher compressive forces across the heel-mortise interface 282 and the tenon-mortise interface 286 (generally parallel to the string tension); a middle joint stress region with generally lower forces across all three interfaces (as this is the region including the mortise retention blocks 168*a*, 168*b*); and a lower joint stress region 292 with generally higher forces concentrated on the tenon-retainer interface 284, as this is the region on which the string tension exerts the most tension forces across an interface (rather than compressive forces found in the upper joint stress region 288) due to the force vector components at this angle. The incorporation of the reinforcement dowel 156 helps counter this strain of this force placed on the tenon portion 140 in a direction that is more transverse to the grain of the wood in the neck 104, which is thus weaker.

Components of an exemplary adjustment mechanism 180 are shown in FIG. 6 and include a tie rod 182, a pair of compression backstop rails 190*a*, 190*b*, a thumbwheel 186, and a backstop plate 194. The tie rod 182 has a first, threaded end 181 and defines a transvers clevis hole 183 at an opposite end. The clevis hole 183 is configured to receive a hinge pin 184. Each of the compression backstop rails 190*a*, 190*b* is formed as a pie-shaped block and defines a pair of through holes 191*a*, 191*b* transverse through a thickness of the compression backstop rails 190*a*, 190*b*. The through holes 191*a*, 191 are configured to receive assembly pins 192*a*, 192*b* that are long enough to provide a separation distance between the two compression backstop rails 190*a*, 190*b* such that the threaded end 181 of the tie rod 182 will fit between them. The threaded end 181 of the tie rod 182 also fits between the assembly pins 192*a*, 192*b*, such that it is “boxed” between the compression backstop rails 190*a*, 190*b* and the assembly pins 192*a*, 192*b*.

The thumbwheel 186 defines a threaded aperture configured to receive the threaded end 181 of the tie rod 182. The thumbwheel 186 seats between the outer arc surfaces of the compression backstop rails 190*a*, 190*b* and the backstop plate 194. A first bushing 188*a* may be provided to seat around the threaded end of the tie rod 182 between the thumbwheel 186 and the backstop plate 194. A second bushing 188*b* may be provided to seat around the threaded end 181 of the tie rod 182 between the thumbwheel 186 and the compression backstop rails 190*a*, 190*b*. The backstop plate 194 may define an aperture 195 configured to align with the threaded aperture in the thumbwheel 186 to allow the threaded end 181 of the tie rod 182 to extend there-through depending upon the level of adjustment of the action. The backstop plate 194 may further define several through holes for passage of mounting screws 196*a*, 196*b* used to affix the backstop plate to the neck block 134.

FIG. 5 also depicts the completed adjustable neck joint 138 including the adjustment mechanism 180. For inclusion of the adjustment mechanism 180, before the tenon portion 140 of the neck 10 is inserted into the mortise portion 160, the tie rod 182 is attached to the tenon rails 141 by placing the end of the tie rod 182 with the clevis hole 183 within the tie rod channel 150 and connecting the tie rod 182 to the tenon portion 140 with the hinge pin 184 inserted through the hinge in holes 152. The tie rod 182 may then lie recessed in the tie rod channel 150 while the tenon portion 140 is rotated into place within the mortise portion 160 as described above. The compression backstop rails 190*a*, 190*b*, assembled with the pins 192*a*, 192*b*, are then placed about the threaded end 181 of the tie rod 182. The wedge portions of the compression backstop rails 190*a*, 190*b* seat between the front surfaces 226 of the inner mortise blocks 166*a*, 166*b* of the mortise portion 160 and the arcuate bottom surface 142 of the tenon rails 141*a*, 141*b*.

The tie rod 182 is of a length such that the threaded portion 181 extends beyond the compression backstop rails 190*a*, 190*b* far enough to engage with the thumbwheel 186. The first bushing 188*a* may be placed about the tie rod 182 before screwing the thumbwheel 186 onto the threaded end 181. The second bushing 188*b* may be placed about the threaded end 181 once the thumbwheel 186 is screwed far enough onto the threads such that the threaded end 181 extends beyond the thumbwheel 186. The backstop plate 194 may be placed against the thumbwheel 186 such that the threaded end 181 of the tie rod 182 aligns with and extends into the aperture 195. The backstop plate 194 may then be affixed to the neck block 134 with a set of mounting screws 196*a*, 196*b*. The backstop plate 196 need not be removed to remove the neck 104 if desired, e.g., for breakdown to transport or for maintenance of the guitar 100. The thumb-screw 186 may merely be turned to force the tie rod 182 forward, and thereby rotate the tenon portion 140 within the mortise portion 160 until the threaded portion 181 releases from the thumbscrew 186. The neck 104 may then be removed from the neck block 134 by rotating in the opposite directions from assembly.

FIG. 5 depicts the guitar 100 in a strung state and indicates how the action can be easily adjusted using the adjustment mechanism 180 in combination with the adjustable neck joint 138. Note first that the tenon portion 140 rotates within the mortise portion 160 about a radius origin 280. All the radii of the arcuate surfaces of the tenon portion 140 and the mortise portion 160 are measured from this radius origin 280 and therefore align concentrically. By sharing a common radius origin 280, all the surfaces easily slide against each other as the neck 104 is rotated during assembly or disas-sembly. For a guitar 100, the natural location for the radius origin 280 is at a point above the 12*th* fret, which is the physical and harmonic center of the strings 116. In this exemplary implementation, the radius origin 280 is set at about 2 mm above the fingerboard 110 above the 12th fret. However, other locations for the radius origin may be selected along the length of the fingerboard and other location may be desirable depending upon the design of the particular stringed instrument. The 2 mm height is generally the middle of the angular range 296 of the action for a guitar at this location. At locations closer to the sound hole 126 at the tail end of the fingerboard 100, the travel distance between the strings 116 and the fingerboard 110 through the action angle 296 may be greater, e.g., about 3 mm. In other stringed instruments, the height of the action and desirable ranges may be different than for a guitar.

As indicated in FIG. 5, the adjustment mechanism 180 may be used to move the tenon portion 140 of the neck 104 within the mortise portion 160 of the neck block 134. By turning the thumbwheel 186, the tie rod 182 is pulled or pushed with an extremely fine adjustment, thus also pulling or pushing the tenon portion 140 through a very small arc. In practice, the tenon portion 140 may arcuately translate through an angle of about 1 degree as indicated by the arcuate translation 294 measured at the hinge pin 184. The arcuate translation 184 of the tenon portion 140 causes the fingerboard 110 to translate through an identical angle with respect to the strings 166 across the angular range 296, thereby providing an adjustment to the action. Further adjustment than about 0.5 degrees in a low action direction will result in the strings 116 positioned too close to the frets 114, which causes buzzing. Further adjustment than about 0.5 degrees in a high action direction is difficult to play and also introduces more significant torque on the saddle 130 and bridge 128. Therefore, the depth of the fretboard bed 162 and thickness of the bed plate 155 may be chosen to create a stop interface that prevents excess rotation in the high action direction.

In another example implementation shown in FIG. 7, a differential screw 300 may be used as the tie rod adjustment arm. A differential screw 300 uses two slightly different thread pitches in two sections 304, 306 along the same shaft 302, which results in movements of the two sections 304, 306 at different rates through respective barrel nuts that act as hinge pins within the heel 108 and neck block 134, respectively. The difference between travel rates is the effective travel rate of the mated parts, e.g., the heel 108 fixed to a first nut 308 engaging the first differential screw section 304 and the neck block 134 fixed to a second nut 310 engaging the second differential screw section 306. The travel distances of each of the differential screw sections 304, 306 are much farther that the relative travel distance of the heel 108 with respect to the neck block 134, for example. The relative travel distance is actually the difference in travel distances of each of the differential screw sections 304, 306 with respect to their nuts 308, 310. (This is similar to how a microscope lens adjuster works.)

In one example embodiment, the first screw section 304 may have a 10-24 thread, which translates to a travel distance of 0.0416" per turn, and the second screw section 306 may have a ¼-20 thread, which translates to a travel distance of 0.050" per turn. When the screw sections 304, 306 are attached to opposing structures (e.g., the heel 134 and the neck block of a stringed instrument), the effective travel distance between the opposing structures is 0.008" per turn. In the context of the stringed instrument, 7.8 turns results in a 1/16" adjustment—a ratio that allows for very fine adjustment with very low force application.

In one example embodiment, one of the nuts, typically the barrel nut 308 in the heel, may be formed of a softer material than a metal, for example, nylon or Delrin® to act as a "weak link." In the event the threads of the barrel nut 308 most internal to the joint, i.e., in the heel 108, become stripped, the outer barrel nut 310 will still work to allow the differential screw 300 to unscrew the far end from the barrel nut 308 in the heel 108, thus releasing the heel 108 from attachment to the differential screw 300 (corresponding to the tie rod adjustment arm) and allow the neck 104 to pivot out of the neck joint 138 and separate from the body 102. In this manner, the neck 108 will not be trapped in the neck joint 138 by the adjustment mechanism 180 using the differential screw 300. Further, if the internal barrel nut 308 is made of a softer material, the threads will more likely shear under excessive force, releasing the internal end of the differential screw 300 and allowing the neck 108 to rotate with respect to the neck block 134. In this manner, the softer barrel nut 308 can act as a "circuit breaker" and potentially prevent damage to or breakage of the neck 108 if the stringed instrument is dropped or otherwise subjected to bending or other torque forces between the neck 108 and the body 102.

It should be appreciated that by using the adjustment mechanism 180, the action can be adjusted off initial center through a full 1 degree of motion without the guitar 100 going out of tune. The axial center of rotation 280 is located along the line of the taut string when the neck 104 is in the middle of the adjustment range. Rotating the neck 104 on this axis 280 within the useful range for a guitar player essentially maintains the distance between the endpoints of the strings 116. Thus, the tension remains unchanged and the strings 116 stays in tune regardless of the angle. Over a 1 degree range (e.g., about 3 mm from a low string position to a high string position at the last fret adjacent to the sound hole 126), there may only be about a 2/1000 in. (0.051 mm) to 4/1000 in. (0.12 mm) change in the length of the strings 116, which translates into a de minimis change in string tension, which further reflects in an almost imperceptible effect on tuning. In fact, a tuning device will still register the guitar 100 in tune as the action is changed from a low position to a high position using the adjustment mechanism 180 in combination with the adjustable neck joint 138.

It may be appreciated that compression backstop rails 190*a*, 190*b* interface with both the tenon portion 140 and the mortise portion 160 of the adjustable neck joint 138 as a form of wedge between the two surfaces. This wedge action helps prevent accidental movement of the neck 104 about the adjustable neck joint 138 by "locking" against the surfaces when the thumbscrew 186 is tightened snug against the compression backstop rails 190*a*, 190*b*. It should be understood that the wedge force of the compression backstop rails 190*a*, 190*b* on the adjustable neck joint 138 does not prevent the fine adjustment movement of the tie rod 182 to change the action height of the strings. Such adjustment may be aided by coating the moving surfaces of the adjustable neck joint 138 with paste wax, which serves as a lubricant and also as a vapor barrier. When the guitar 100 is strung with the strings 116, the tension on the strings 116 locks the tenon portion 140 and the mortise portion 160 rigidly together in the adjustable neck joint 138, creating a strong joint that fully counters and withstands the string tension.

The curved, sliding, adjustable neck joint 138 is unique in form and function. There are many variations on mortise-and-tenon joints and sliding dovetails in woodworking. However, curved dovetails are extremely rare. The adjustable neck joint 138 functions partly like a mortise-and-tenon and partly like a dovetail. It is a cantilevered hinge that requires no hardware to function. A neck joint that doesn't rely on glue or fasteners is new to the art of stringed instruments. Further, all other adjustable neck joints rely on metal fasteners or brackets.

Stringed instrument necks are cantilevered by necessity for ergonomics. Most necks either use glued joints or fasteners that directly oppose the cantilever load caused by the string tension that would otherwise threaten to fold up the neck and body like a hinge. The adjustable neck joint 138 resolves the tension within the joint without requiring a fixed angle between the body 102 and neck 104 like traditional stringed instrument construction, which results in a fixed action height. Equilibrium across the adjustable neck joint 138 is achieved by spreading the compressive and the twisting loads over the semi-cylindrical faces of the tenon portion 140 and the mortise portion 160 across multiple interfaces 282, 284, 286. The neck 104 and body 102 remain free to rotate around the eccentric axis, either circular or elliptical by design choice, while under load from the string tension and thereby allow for adjustment of action height.

A number of benefits are achieved by the adjustable neck joint 138 as disclosed herein. Foremost, the action is easy to adjust by changing the angle of the neck 104 with respect to the body 102. Changing the action on most acoustic guitars necessitates de-tuning the strings and modifying the saddle with tools. This design allows for changing the action with the turn of a thumb wheel 186. The range of adjustment is also likely sufficient to overcome warping of the body 102 over time, so a neck reset should not be necessary.

The ideal height of the bridge 128 and saddle 130 can be selected and the neck angle can match it for whatever action the player chooses. Instruments sound different depending on the amount of twisting force on the bracing caused by the lever arm of a higher or lower saddle. Typical instruments have neck angles set with a particular saddle height target for ideal tone, but if the player wants an action that is higher or lower than the builder anticipated (or if the guitar warps over time) the saddle will be higher or lower than the target. The ability to adjust the action with the thumb wheel 186 obviates this problem.

The tuning remains unaffected by the change in angle, so changing the action during a performance is possible. The center of rotation is located along the line of the taut strings 116 when the neck 104 is in the middle of the adjustment range. Rotating the neck 104 on this axis within the useful range for a guitar player essentially maintains the distance between the endpoints of the strings 116—thus, the tension remains unchanged and the strings 116 stay in tune regardless of the angle.

In the example implementation disclosed, the curved mortise portion 160 of the neck block 134 is machined as multiple blocks that are then glued together with dowels. This ensures that the neck 104 is in alignment with the long axis of the guitar 100 and cannot rotate in any unintended way. Several redundant load bearing surfaces are machined in the heel 108 perpendicular to the long axis of the neck 104 to form the tenon portion 140 and constrain side-to-side movement. The string tension between the neck 104 and body 102 is spread over a broad wooden surface area in the joint. In comparison to typical dovetail joints in the violin family of stringed instruments, the adjustable neck joint 138 has more than twice the wood-on-wood surface area contact providing significantly greater distribution of the load across the joint.

The connection between body 102 and neck 104 is a wooden joint, which is an attribute valued by many players for the tone. The adjustable neck joint 138 requires no metal hardware to maintain the neck angle under string tension. The adjustment mechanism 180 is also not loaded by string tension. Metal hardware often buzzes and rattles, particularly when under tension, and that likelihood is reduced with this design. Because the adjustable neck joint 138 allow the neck 104 to be easily removed from the body 102, the design makes it possible to have different necks for a single body. Musicians who sometimes play fretless or with additional strings may find it advantageous to swap necks on and off the same body if they like the tone generated by the body.

Notwithstanding the benefits of avoiding metal hardware, there are embodiments in which the use of metal structures can provide greater strength while being mounted in such a way that possible noise is entirely dampened and avoided. In one such implementation, the mortise portion in the neck block of the body may define two opposing arcuate grooves of constant radius (i.e., the arcs are circular sections), depth (e.g., ½" deep), and width (e.g., ⅛" wide). An arcuate piece of metal may be fixed within each groove and extend laterally into the mortice area (e.g., about ¼" protrusion) when fully seated in the grooves to form respective trunnions. In one embodiment, the metal trunnion pieces may be cut from a section of metal pipe of a radius congruent with the radius origin for the arc of the tenon on the heel moving within the mortice of the neck block (e.g., the 12$^{th}$ fret on the neck of a guitar). In one embodiment, the radius of the arc of the grooves matches the dimensions of a 6" diameter metal pipe. In some implementations, the metal may be aluminum to offer a lightweight, smooth surface for joint movement, while providing significant strength to the joint without degradation, e.g., rust. The tenon on the heel of the neck is similar to the all-wood version of the joint described above. The difference is that instead of a forming a wooden I-beam shape, corresponding grooves are cut into lateral sides of the tenon on the heel to mate with the metal trunnions. The metal trunnions create a durable and precise trunnion for the neck to slide along.

In this embodiment, the tie rod adjustment arm may be a differential screw as described above interfacing with two barrel nuts, one in each of the neck block in the body and the heel of the neck to act as connectors and hinge pins. The first tie rod hinge pin is a barrel nut in the tenon of the heel, which is positioned in a similar location as in prior embodiments. The second tie rod hinge pin may be in the form of a barrel nut fixed within the neck block under the backboard instead of floating on the heel. A hole in the backboard may allow for access by an adjustment wrench to the end of the differential screw for adjustment or removal.

The neck 104 is also easy to remove for shipping. When acoustic guitars are shipped, there is a high risk of damage if the case is dropped. The design requirements for a slim guitar neck conspire to make the area near the nut the likeliest point of breakage when the inertia of the relatively massive body pushes the headstock against the case in a fall. With the adjustable neck joint 138 disclosed herein, the player can easily remove the neck 104 for shipping and thereby avoid a common cause of damage.

String Anchor for Use with Floating Bridge

In another implementation, an alternative bridge design is disclosed. In order to contrast the features of the alternative bridge, an initial discussion of a typical prior art pin bridge 328 depicted in the portion of a prior art guitar 300 of FIG. 8. The pin bridge 328 supports a saddle 330 and also includes a pin hole section 331 for termination of the strings 316. The pin hole section 331 defines six holes, one for each string, in a row behind the saddle 330 that extend through the pin bridge 328. In the prior art, a pin bridge 328 is typically glued to the top of the soundboard 320 beyond the sound hole. The soundboard 320 defines holes aligned with and position beneath the holes in the pin hole section 331. A bridge plate 340, e.g., a flat piece of wood used as a supporting structure may further be glued to the bottom side of the soundboard 320 beneath the bridge 328 within the resonant enclosure of the body. Additional holes corresponding to and aligning with the holes in the pin hole section 331 and the soundboard 320 may also be provided in the bridge plate 340. The ends of the strings 316 extend over the saddle 330 and pass through the holes in the pin hole section 331 of the pin bridge 328, the corresponding holes in the soundboard 320, and the corresponding holes in the bridge plate 340. The strings 316 are retained in the pin hole section 331 by bridge pins 329.

Wire strings 316 typically terminate with ball ends 317 as a structural aid to retain the strings 316 with the pin hole section 331 in the pin bridge 328. The ball ends 317 are typically small metal rings that the string wires wrap around. The ends of string wires then are twisted back on their length to form a tight eye around the ball ends 317, which form the terminal ends of the strings 316. The aligned holes through the pin hole section 331, the soundboard 320, and the bridge plate 340 are large enough for the ball ends 317 to pass through. The bridge pins 329 are formed with a head on top and then taper conically along their length to a bottom end. The bridge pins 329 are inserted into respective holes in the pin hole section 331 of the pin bridge 328 and fit tightly therein as a wedge and compress the strings 316 against the rear sides of the holes. The ball ends 317 are restrained against the bottom surface of the bridge plate 340 and the side wall of the tapered section of the bridge pins 329, thereby securing the ends of the strings 316 to the pin bridge 328. The strings 316 typically form a "break angle" of about 25-30 degrees from the top of the saddle 330 to the holes in the pin hole section 331. This angle provides a good balance between maintaining the longitudinal tension along the strings 316 and resisting the rotational torque on the saddle 330 and pin bridge 328 caused by the downward force component of the strings 316 behind the saddle 330.

A typical fixed pin bridge 328 such as shown in FIG. 8 relies on a glue seam between the pin bridge 328 and the soundboard 320 to hold up to 170 lbs (756 N) or more of tension on the strings 316. Changes in humidity often break this seam loose or crack the soundboard top 320 of the guitar 300 due to the mismatch in rates or amounts of seasonal shrinkage between the harder wood species used for the bridge 328 and the softer wood species used for the soundboard 320. Additionally, over time, as a saddle is lowered to maintain an appropriate action height, the break angle may decrease to as little as 10 degrees. When the break angle is this shallow, there may not be enough downward tension on the strings 316 across the saddle 330, resulting poor tone. One solution when the saddle 330 gets to low (e.g., about 1/16" from the wood of the pin bridge 328) is to cut channels between the saddle slot and the bridge pin holes so that the strings 316 can take a more direct path downward to the bridge plate 340.

FIGS. 9-13 disclose a new implementation of a bridge system 405 for an acoustic guitar 400 or similar stringed instrument. The bridge system 405 is provided by a combination of a bridge 428 and saddle 430, a bridge plate 440, and a string anchor 450 as shown and further described below. As depicted, the bridge 428 sits on top of the soundboard 402 beyond the sound hole and supports a saddle 430. In this implementation, the bridge 428 may "float," i.e., it may not be glued to the soundboard 420 of the guitar 400. This allows the player some flexibility in placement of the bridge for tone and allows the player to swap out different bridges and saddles as desired. In addition, because the bridge 428 is not glued to the soundboard 420, differences in seasonal shrinkage and expansion of different species of wood as between the bridge 428 and the soundboard 420 due to humidity and temperature will not negatively affect the interface between either structure.

A series of six eyeholes 422 are formed within and through the soundboard 420 behind and parallel to the bridge 429. The eyeholes 422 may be keyhole-shaped with a larger circular opening on one side closest to the bridge and a rectangular €slot of narrower width that the diameter of the circular portion extending away from the circular portion toward the tail of the guitar 400. The circular portions of the eyeholes 422 are of a diameter large enough for a ball end 417 of a wire guitar string 416 to pass through.

The bridge plate 440 is affixed to the underside of the soundboard 420 and seats beneath the bridge 428 and extends toward the tail of the guitar 400 underneath the eyeholes 422 and beyond. As depicted in isolation in FIG. 10, the bridge plate 440 may be formed with two different sections: a flat, uniformly thinner shelf section 442 that extends under the soundboard eyeholes 422 and a thicker cleat section 444 that generally seats underneath the bridge 428. The shelf section 442 defines a series of six bridge plate eyeholes 446 that are formed as keyhole-shapes of the same size and form as the soundboard eyeholes 422 and are positioned underneath and directly aligned with the soundboard eyeholes 422. As shown in FIGS. 12 and 13, in some implementations, the bridge plate 440 may be formed to fit within and butt against bracing strips 460 adhered to the underside of the soundboard 420. Bracing strips 460 are provided in various design patterns to reinforce the soundboard 420 and also affect the resonance generated by the soundboard 420 and the body cavity depending on number, size, location, and stiffness of the wood species.

The string anchor 450, depicted in isolation in FIG. 11, is a counterpart functionally to the bridge pins 329 and bridge plate 340 in the prior art only in that it secures the ends of the strings to the body of the guitar 400. The string anchor 450 is positioned with the body of the guitar 400 on the shelf section 442 of the bridge plate 440. The string anchor 450 is not glued or otherwise affixed or adhered to the bridge plate 440; it is a floating piece. The edge of the string anchor 450 away from the tail abuts against and interfaces with the cleat section 444 of the bridge plate 440. In some implementations, the string anchor 450 may be removably attached to the shelf section 442, for example, with double sided tape or a small set of opposing magnets in each of the string anchor 450 and the shelf section 432 in order to hold the string anchor in position while stringing the guitar 400 before tension is applied to the strings 416 to firmly hold the string anchor 450 in place. The string anchor 450 defines a series of six anchor eyeholes 452 that are formed as keyhole-shapes of the same size and form as the soundboard eyeholes 422 and are positioned underneath and directly aligned with the soundboard eyeholes 422 and the bridge plate eyeholes 446. The string anchor 450 further defines a recessed ball tray 454 behind the anchor eyeholes 452 toward the tail of the guitar 400. As best shown in FIG. 11, the recessed ball tray 454 is adjacent to the slot portions of the eyeholes 452 and is oriented parallel to the bridge 428. The recessed ball tray 454 is of a width designed to receive and retain the ball ends 417 of the strings 416 as depicted in FIGS. 11 and 12.

When the guitar 400 is strung, the ball ends 417 of the strings 416 are passed through the circular openings in the soundboard eyeholes 422, the bridge plate eyeholes 446, and the string anchor eyeholes 452 and are seated within the recessed ball tray 454. As the strings 416 are placed under tension by turning the keys and pegs attached to the far ends of the strings 416 at the headstock, the string anchor 450 is pulled tightly against the cleat 444 on the bridge plate 440, which holds the string anchor 450 in place. The bracing 460 abutting the bridge plate 440 provides additional resistance to the string tension. The strings 416 extend from within the body of the guitar within the slot portions of each of the eyeholes 422, 446, 452 and are held firmly against the saddle 430.

Depending upon designed location of the components of the bridge system 405, the angle of the strings 416 extending from the tail side of the saddle 430 may be preset across an acceptable range. For example, in the implementation shown in FIGS. 9-13, the strings 416 extend from the bridge 430 at an angle of about 40 degrees, which is less steep than typical angles using prior art pin bridges. At a 40 degree angle, the downward vector of the string tension force is reduced (similar to a jazz or classical guitar with a tailpiece for securing the ends of the strings), resulting less rotational or twisting force on the saddle 430 and bridge 428. Additionally, because the bridge 428 is floating and not adhered to the surface of the soundboard 420, the torque on the bridge 428 is not significantly translated to the soundboard 420, reducing the likelihood of cracking the soundboard 420 due to humidity stress.

The string anchor 450 of the bridge system 405 of the disclosed implementation, functions like a "deadman" anchor in construction and other fields. As described above, typical steel string bridges have a pin bridge. Nylon string guitars usually have a string-through tie block or have a floating bridge and a tailpiece to which the strings are tied off. Each of these prior art designs load the bridge and the bracing under the soundboard differently. The disclosed design of the bridge system 405 separates the bridge into two parts with different jobs: a floating bridge 428 to hold the saddle 430, and an internal floating string anchor 450 that also braces the soundboard 420 laterally. The string anchor 450 functions more like a tailpiece (although connected to the soundboard rather than the tail block), assuming a greater amount of the longitudinal load and reducing the torque across the bridge 428.

Since the internal string anchor 450 is not glued in place, it can be replaced when the ball-ends 417 wear out the recessed ball tray 454. In contrast, patching or replacing a worn-out bridge plate under a standard pin bridge can be costly. As an added benefit, the guitar builder can string up the guitar before finishing to assess quality of construction, tolerances, and even tone before applying final finishes (e.g., stains and lacquers). With typical guitar construction, the bridge cannot be glued to the soundboard until after the body finishes are completed, thus preventing the guitar to be strung until completely built.

Additionally, interchangeable string anchors 450 of different wood species can be swapped in and out to change the tone of the guitar or to pair with different string types. For example, a lighter, more flexible wood species spring anchor may be used with extra-light gauge strings. String anchors made of stronger or denser wood species can be inserted to increase the stiffness of the soundboard 402 and thus change the tone and increase sustain of the guitar.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples."

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

The above specification, examples and data provide a complete description of the structure and use of exemplary embodiments of the invention as defined in the claims. Although various embodiments of the claimed invention have been described above with a certain degree of particularity, or with reference to one or more individual embodiments, other embodiments using different combinations of elements and structures disclosed herein are contemplated, as other iterations can be determined through ordinary skill based upon the teachings of the present disclosure. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. An adjustable neck joint for a stringed instrument comprising:

a neck with a heel portion formed as a first half of a rotating joint; and a neck block formed as a second half of the rotating joint; wherein the first half of the rotating joint and the second half of the rotating joint are each configured to connect with each other and movably interface with each other such that the neck is rotatable with respect to the neck block about an axis perpendicular to a longitudinal axis of the neck;

the first half of the rotating joint is one of an arcuate mortise or an arcuate tenon structure; and the second half of the rotating joint is an opposing one of the arcuate mortise or arcuate tenon structure to the first half of the rotating joint.

2. The adjustable neck joint of claim 1, wherein:

the first half of the rotating joint is an arcuate, T-shaped tenon structure; and the second half of the rotating joint is an arcuate mortise structure configured to accept and retain the arcuate, T-shaped tenon structure.

3. The adjustable neck joint of claim 1, wherein:

the first half of the rotating joint comprises one of an arcuate trunnion extending from sidewalls of or a corresponding arcuate channel defined within sidewalls of one of the heel portion and the neck block; and the second half of the rotating joint comprises an opposing one of the arcuate trunnion or the arcuate channel to the first half of the rotating joint.

4. The adjustable neck joint of claim 3, wherein the trunnion is formed of metal as an arcuate section of a cylinder.

5. The adjustable neck joint of claim 1 further comprising an adjustment mechanism attached at a first end to the first half of the rotating joint and constrained with respect to the neck block at a second end, wherein the adjustment mechanism is configured to finely move the heel portion with respect to the neck block through an angle of at least 1 degree, such angle having a vertex located on the axis.

6. A stringed instrument comprising:

a neck with a heel portion formed as a first half of a rotating joint; and a body with a neck block formed as a second half of the rotating joint; wherein the first half of the rotating joint and the second half of the rotating joint are each configured to connect with each other and movably interface with each other such that the neck is rotatable with respect to the body about an axis perpendicular to a longitudinal axis of the neck;

the first half of the rotating joint is one of an arcuate mortise or an arcuate tenon structure; and the second half of the rotating joint is an opposing one of the arcuate mortise or arcuate tenon structure to the first half of the rotating joint.

7. The stringed instrument of claim 6, wherein the neck further comprises a peghead on an opposite end of the neck from the heel; and a fingerboard extending along a top surface of the neck from the peghead to beyond the heel;

the body further comprises a top surface;

a bridge mounted on the top surface; and a string termination structure connected to the body; and the stringed instrument further comprises a plurality of strings, each connected at a first end to the peghead and at a second end to the string termination structure, extending above and along the fingerboard, and supported above the top surface of the body by the bridge at an intermediate location along a length of each string; and further wherein upon rotation of the first half of the rotating joint with respect to the second half of the rotating joint, the fingerboard moves toward or away from the strings, thereby adjusting an action; and upon such adjustment of the action, the strings remain in tune.

8. The stringed instrument of claim 7, wherein the axis is positioned immediately adjacent to and above a position along the neck within a plane defined by two or more of the strings.

9. The stringed instrument of claim 6, wherein:

the first half of the rotating joint is an arcuate, T-shaped tenon structure; and the second half of the rotating joint is an arcuate mortise structure configured to accept and retain the arcuate, T-shaped tenon structure.

10. The stringed instrument of claim 6, wherein:

the first half of the rotating joint comprises one of an arcuate trunnion extending from sidewalls of or a corresponding arcuate channel defined within sidewalls of one of the heel portion and the neck block; and the second half of the rotating joint comprises an opposing one of the arcuate trunnion or the arcuate channel to the first half of the rotating joint.

11. The stringed instrument of claim 10, wherein the trunnion is formed of metal as an arcuate section of a cylinder.

12. The stringed instrument of claim 6 further comprising an adjustment mechanism attached at a first end to the first half of the rotating joint and constrained with respect to the neck block at a second end, wherein the adjustment mechanism is configured to finely move the heel portion with respect to the neck block through an angle of at least 1 degree, such angle having a vertex located on the axis.

13. The stringed instrument of claim 12, wherein the adjustment mechanism comprises a tie rod.

14. The stringed instrument of claim 12, wherein the adjustment mechanism comprises a differential screw.

15. The stringed instrument of claim 6, wherein the stringed instrument is a guitar.

16. A method for adjusting an action of a stringed instrument, wherein the stringed instrument comprises:

a neck with a heel portion formed as a first half of a rotating joint;

a body with a neck block formed as a second half of the rotating joint, wherein:

the first half of the rotating joint and the second half of the rotating joint are each configured to connect with each other and movably interface with each other such that the neck is rotatable with respect to the body about an axis perpendicular to a longitudinal axis of the neck;

the first half of the rotating joint is one of an arcuate mortise or an arcuate tenon structure; and the second half of the rotating joint is an opposing one of the arcuate mortise or arcuate tenon structure to the first half of the rotating joint; and an adjustment mechanism attached at a first end to the heel portion in the first half of the rotating joint and constrained with respect to the neck block at a second end; wherein the method comprises operating the adjustment mechanism to finely move the heel portion with respect to the neck block within the rotating joint through an angle of at least one degree, the angle having a vertex located on the axis, such that the a surface of the neck is movable toward and away from strings of the stringed instrument while the strings remain in tune.

17. The method of claim 16 further comprising:

operating the adjustment mechanism to disengage attachment of the first end of the adjustment mechanism from the heel portion in the first half of the rotating joint; and rotating the heel portion through the rotating joint until the heel portion disengages from the neck block.

18. The method of claim 17 further comprising:

inserting the heel portion into the neck block to connect the heel portion to the neck block and form the rotating joint;

engaging the first end of the adjustment mechanism with the heel portion;

rotating the neck with respect to the body about the axis of the rotating joint; and tightening the adjustment mechanism to firmly affix the heel portion within the neck block and resist rotation of the neck with respect to the body through the rotating joint.

* * * * *